(12) United States Patent
Shigeta et al.

(10) Patent No.: US 8,951,714 B2
(45) Date of Patent: Feb. 10, 2015

(54) RELIEF PRINTING PLATE MANUFACTURING METHOD, RELIEF PRINTING PLATE CREATING APPARATUS, AND RECORDING MEDIUM

(75) Inventors: Norimasa Shigeta, Kanagawa (JP); Hirokazu Kondo, Kanagawa (JP); Takeshi Kiso, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 217 days.

(21) Appl. No.: 13/586,414

(22) Filed: Aug. 15, 2012

(65) Prior Publication Data
US 2013/0075376 A1  Mar. 28, 2013

(30) Foreign Application Priority Data
Sep. 26, 2011 (JP) ................... 2011-209420

(51) Int. Cl.
| | | |
|---|---|---|
| B41C 1/10 | (2006.01) | |
| B23K 26/36 | (2014.01) | |
| B41C 1/05 | (2006.01) | |
| B41N 1/12 | (2006.01) | |

(52) U.S. Cl.
CPC ............. *B41C 1/05* (2013.01); *B41C 1/1033* (2013.01); *B41C 1/1008* (2013.01); *B41C 1/10* (2013.01); *B23K 26/36* (2013.01); *B41N 1/12* (2013.01)
USPC ........... 430/306; 101/395; 101/483; 101/494; 264/400; 358/3.29; 358/3.31

(58) Field of Classification Search
CPC .................................. B41C 1/10; B23K 26/36
USPC ............. 430/300–310; 101/383, 394, 395; 264/400; 358/3.29, 3.31; 347/224–264
See application file for complete search history.

(56) References Cited

U.S. PATENT DOCUMENTS

| | | | | |
|---|---|---|---|---|
| 6,888,853 | B1* | 5/2005 | Jurgensen | 372/6 |
| 7,060,417 | B2* | 6/2006 | Carlsen et al. | 430/306 |
| 8,649,053 | B2* | 2/2014 | Shigeta et al. | 358/1.7 |
| 2003/0151246 | A1* | 8/2003 | Baldus et al. | 283/57 |

(Continued)

FOREIGN PATENT DOCUMENTS

| | | |
|---|---|---|
| JP | 2002-178654 A | 6/2002 |
| JP | 2003-43672 A | 2/2003 |

(Continued)

OTHER PUBLICATIONS

Extended European Search Report for European Application No. 12184884.0, dated Sep. 5, 2014.

*Primary Examiner* — Samuel M Heinrich
(74) *Attorney, Agent, or Firm* — Birch, Stewart, Kolasch & Birch, LLP

(57) ABSTRACT

A relief printing plate manufacturing method includes: generating binary image data based on multivalued image data representing a printing image; generating, from the binary image data, target stereoscopic shape data; calculating, based on the target stereoscopic shape data, exposure amount data; providing a predetermined exposure amount to an outside image adjacent pixel in a range of predetermined pixels adjacent to an ON pixel; and applying laser light to an area of OFF pixels based on the exposure amount data to engrave a portion outside of an area, and applying laser light to the outside image adjacent pixel based on the predetermined exposure amount to form a relief having a projecting shape with a corner part of a flange part of a top face of the relief at least partially chamfered.

22 Claims, 23 Drawing Sheets

(56) References Cited

U.S. PATENT DOCUMENTS

| | | | |
|---|---|---|---|
| 2004/0025728 A1* | 2/2004 | Adamczyk | 101/395 |
| 2009/0223397 A1 | 9/2009 | Miyagawa et al. | |
| 2010/0218694 A1* | 9/2010 | Wier et al. | 101/483 |
| 2011/0198325 A1 | 8/2011 | Norimatsu et al. | |
| 2012/0017787 A1 | 1/2012 | Mushano et al. | |

FOREIGN PATENT DOCUMENTS

| | | |
|---|---|---|
| JP | 2009-214334 A | 9/2009 |
| JP | 2009-234255 A | 10/2009 |
| JP | 2009-286113 A | 12/2009 |
| JP | 2010-234754 A | 10/2010 |
| WO | WO 2010/114155 A1 | 10/2010 |

* cited by examiner

RELIEF PRINTING PLATE MANUFACTURING METHOD, RELIEF PRINTING PLATE CREATING APPARATUS, AND RECORDING MEDIUM

BACKGROUND OF THE INVENTION

1. Field of the Invention

The presently disclosed subject matter relates to a relief printing plate (letterpress printing plate) manufacturing method, relief printing plate creating apparatus, a non-transitory recording medium storing a computer readable program code for executing a process of the method, and a computer program product storing executable code for the method and, in particular, to the structure of a relief printing plate suitable for flexo printing and its plate-making technology.

2. Description of the Related Art

In flexo printing which is one kind of relief printing, a flexible, resilient plate material such as a rubber sheet or photo-curable resin sheet is used. And, a projection (a relief) forming a projecting shape for dot printing is formed on the surface of the plate material according to the details of the printing image. To a top part of the relief on a flexo printing plate, ink is provided from an anilox roller. The ink provided to this top part of the relief is transferred to a printing body for printing. Since the plate material has resilience in flexo printing, flexo printing is advantageously suitable for printing on a material with some asperities on the surface of the printing body (for example, corrugated cardboard).

On the other hand, since the plate material is soft, disadvantageously, the relief is deformed by printing pressure to increase the thickness of dots (to increase dot gain). And, superfluous ink is pushed from the top face of the relief to the surroundings to increase the thickness of dots (cause a marginal phenomenon). Also, an increase in thickness of dots disadvantageously causes deterioration of granularity (fluctuations in density representing roughness of an image). In particular, problems arise, such as a decrease in reproducibility of fine lines, an increase in thickness of characters, a decrease in tone reproducibility in a highlighted area, and an occurrence of unevenness (lack in uniformity) of printing density in a halftone dot part and a filled-in part.

Japanese Patent Application Laid-Open No. 2009-234255 discloses a method in which, for the purpose of fine laser engraving of a projection on a plate, light power for engraving an area adjacent to the projection to be left as projecting is suppressed to suppress engraving on the upper surface of the projection and also light power for its outside adjacent area is increased to steepen the gradient of the side surface of the projection.

Japanese Patent Application Laid-Open No. 2002-178654 and Japanese Patent Application Laid-Open No. 2009-286113 each disclose a structure in which a depression is provided on the top face of the relief in view of improving ink transferability in a filled-in part and mitigating a marginal phenomenon.

Japanese Patent Application Laid-Open No. 2003-043672 discloses that an average roughness of the plate surface is 0.1 μm to 0.6 μm in view of improving ink transferability in a filled-in part.

SUMMARY OF THE INVENTION

Japanese Patent Application Laid-Open No. 2009-234255 discloses that the relief is steepened. When the relief is steepened, resistance to pressure may be weakened, disadvantageously deforming fine lines and increasing dot gain of small halftone dots.

In Japanese Patent Application Laid-Open No. 2002-178654, superfluous ink enters the depression formed on the top face of the relief. Therefore, an effect can be achieved such that the superfluous ink does not spread around at the time of transferring ink to the printing body (a marginal phenomenon can be suppressed). However, this is not sufficient for mitigating dot gain. Japanese Patent Application Laid-Open No. 2009-286113 discloses a method effective for a faint filled-in part, but dot gain is not reduced.

In Japanese Patent Application Laid-Open No. 2003-043672, while an effect of improving unevenness in a filled-in part can be achieved, dot gain is not mitigated.

The presently disclosed subject matter was made in view of the circumstances described above. An object of the presently disclosed subject matter is to provide a relief printing plate manufacturing method, a relief printing plate creating apparatus, a non-transitory recording medium and a computer program product storing executable code for manufacturing a relief printing plate by laser engraving, wherein the relief printing plate is capable of achieving high-definition and high-image-quality printing by reducing dot gain and suppressing a marginal phenomenon.

To achieve the object described above, a relief printing plate manufacturing method according to the presently disclosed subject matter, can manufacture a relief printing plate by laser engraving. The method includes: a binary image data generating step of generating binary image data based on multivalued image data representing a printing image; an engraving target shape data generating step of generating, from the binary image data, target stereoscopic shape data which can be used as an engraving target; an exposure amount data generating step of calculating, based on the target stereoscopic shape data, exposure amount data for controlling an output of laser light by a laser engraving machine; an edge exposure amount setting step of providing a predetermined exposure amount to an outside image adjacent pixel in a range of predetermined pixels adjacent to an ON pixel corresponding to an image part of the binary image data; and a laser engraving step of applying laser light to an area of OFF pixels corresponding to a no-image part of the binary image data on the plate based on the exposure amount data to engrave a portion outside of an area to be left on the plate as the image part, and also applying laser light to the outside image adjacent pixel on the plate based on the predetermined exposure amount set in the edge exposure amount setting step to form a relief having a projecting shape with a flange part of a top face of the relief corresponding to the image part at least partially chamfered.

According to the relief printing plate manufacturing method of the presently disclosed subject matter, a relief having a projecting shape with the flange part of the top face of the relief at least partially chamfered can be obtained. The relief printing plate manufactured by the presently disclosed subject matter can suppress dot gain, can reduce the spread of ink due to a marginal phenomenon, and furthermore can suppress the falling down of the relief due to printing pressure. With this, high-definition and high-image-quality printing can be achieved.

Note that the term "chamfered" is not restricted to "C-chamfered (45-degree chamfered)" in which a corner part is cut out along a flat inclined surface, and a chamfering angle can be designed as appropriate. Also, as "R-chamfered (round-chamfered)", "chamfered" includes a type in which a corner part is rounded with a smooth curved surface (including a surface projecting upward, a surface projecting downward, and a surface formed in combination thereof).

The shape may be such that the entire perimeter of the flange of the top face is chamfered or that the flange of the top face is partially chamfered.

In an aspect of the presently disclosed subject matter, with the application of laser light to the outside image adjacent pixel in the laser engraving step, the top face of the relief on the plate preferably has an area smaller than an area of the ON pixel in the binary image data.

With the area of the top face being smaller, ink provided to the top face can escape to the cap chamfered part. Therefore, the spread of ink due to a marginal phenomenon (an increase in thickness of a dot) can be suppressed.

In another aspect of the presently disclosed subject matter, an exposure amount to be provided to the outside image adjacent pixel is preferably smaller than an exposure amount to be provided to the area of the OFF pixels corresponding to the no-image part.

Compared with the laser exposure amount required for engraving a no-image part, a smaller laser exposure amount required for forming the cap chamfered part can be sufficient.

In still another aspect of the presently disclosed subject matter, the laser beam to be applied onto the plate can be configured to have a beam diameter larger than a width of one pixel of the binary image data.

As laser light for engraving, a beam having a beam cross section area capable of exposing a range wider than one pixel of binary image data can be used. According to the beam diameter of laser light, the range of outside image adjacent pixels can be defined.

The outside image adjacent pixels in the presently disclosed subject matter can be in a range of respective surrounding pixels adjacent to the ON pixel.

In still another aspect of the presently disclosed subject matter, parameters of an exposure amount required for chamfering the flange part of the top face can be retained (held, stored) according to types of plate materials. And, data of the predetermined exposure amount can be variably set correspondingly to a type of a plate material for use.

According to this aspect, appropriate parameters can be set for various types of plate materials.

In still another aspect of the presently disclosed subject matter, parameters of an exposure amount required for chamfering the flange part of the top face can be retained (held, stored) according to combinations of types of plate materials and types of printing bodies. And, data of the predetermined exposure amount can be variably set correspondingly to a combination of a type of a plate material and a type of a printing body for use.

According to this aspect, appropriate parameters can be set for each combination of a plate material and a printing body (medium).

A relief printing plate manufacturing method according to still another aspect of the presently disclosed subject matter further includes: a random exposure amount providing step of providing an exposure amount to a pixel area corresponding to the top face of the relief in a random manner; and a random asperities forming step of applying laser light to the top face of the relief according to the exposure amount provided in the random manner to form a plurality of depressions having irregular depths at irregular positions on the top face of the relief.

According to this aspect, random asperities can be formed on the relief top face by laser engraving. The relief printing plate created according to this aspect has unevenness in a halftone dot part and a filled-in part mitigated.

Also, the exposure amount to be provided to the top face in the random manner is preferably smaller than the exposure amount to be provided to the outside image adjacent pixel.

The laser exposure amount for forming random asperities on the top face can be smaller than the exposure mount for forming the cap chamfered part.

Furthermore, to achieve the object described above, a relief printing plate creating apparatus according to the presently disclosed subject matter can manufacture a relief printing plate by laser engraving. The apparatus includes: binary image data generating means generating binary image data based on multivalued image data representing a printing image; engraving target shape data generating means generating, from the binary image data, target stereoscopic shape data which can be used as an engraving target; exposure amount data generating means calculating, based on the target stereoscopic shape data, exposure amount data for controlling an output of laser light by a laser engraving machine; edge exposure amount setting means providing a predetermined exposure amount to an outside image adjacent pixel in a range of predetermined pixels adjacent to an ON pixel corresponding to an image part of the binary image data; and laser engraving means applying laser light to an area of OFF pixels corresponding to a no-image part of the binary image data on the plate based on the exposure amount data to engrave a portion surrounding an area to be left on the plate as the image part, and also applying laser light to the outside image adjacent pixel on the plate based on the predetermined exposure amount set by the edge exposure amount setting means to form a relief having a projecting shape with a corner part of a flange part of a top face of the relief corresponding to the image part at least partially rounded or chamfered.

In an aspect of the presently disclosed subject matter, the apparatus further includes parameter recording means recording parameters of an exposure amount required for rounding or chamfering the flange part of the top face according to types of plate materials. And, the data of the predetermined exposure amount can be variably set correspondingly to a type of a plate material for use.

In another aspect of the presently disclosed subject matter, the apparatus further includes parameter recording means recording parameters of an exposure amount required for rounding or chamfering the flange part of the top face are retained (held, stored) according to combinations of types of plate materials and types of printing bodies. And, the data of the predetermined exposure amount can be variably set correspondingly to a combination of a type of a plate material and a type of a printing body for use.

In still another aspect of the presently disclosed subject matter, the apparatus further includes random exposure amount providing means providing an exposure amount to a pixel area corresponding to the top face of the relief in a random manner. And, the laser engraving means can apply laser light to the top face of the relief according to the exposure amount provided in the random manner to form a plurality of depressions having irregular depths at irregular positions on the top face of the relief.

To achieve the object described above, a non-transitory recording medium and/or a computer program product storing a program is provided for causing a computer to execute the steps including: a binary image data generating step of generating binary image data based on multivalued image data representing a printing image; an engraving target shape data generating step of generating, from the binary image data, target stereoscopic shape data as an engraving target; an exposure amount data generating step of calculating, based on the target stereoscopic shape data, exposure amount data for controlling an output of laser light by a laser engraving machine; and an edge exposure amount setting step of providing a predetermined exposure amount to an outside image adjacent pixel in a range of predetermined pixels adjacent to an ON pixel corresponding to an image part of the binary image data.

According to the relief printing plate manufacturing method, relief printing plate creating apparatus, a non-transitory recording medium and a computer program product of the presently disclosed subject matter, a relief printing plate capable of achieving high-definition and high-image-quality printing can be manufactured by laser engraving.

DETAILED DESCRIPTION OF THE EMBODIMENTS

Embodiments of the presently disclosed subject matter are described in detail below according to the attached drawings.

First, preferable embodiments of a relief printing plate for achieving high-definition and high-image-quality printing by reducing dot gain and suppressing a marginal phenomenon are described.

<First Embodiment>

Figure 1:
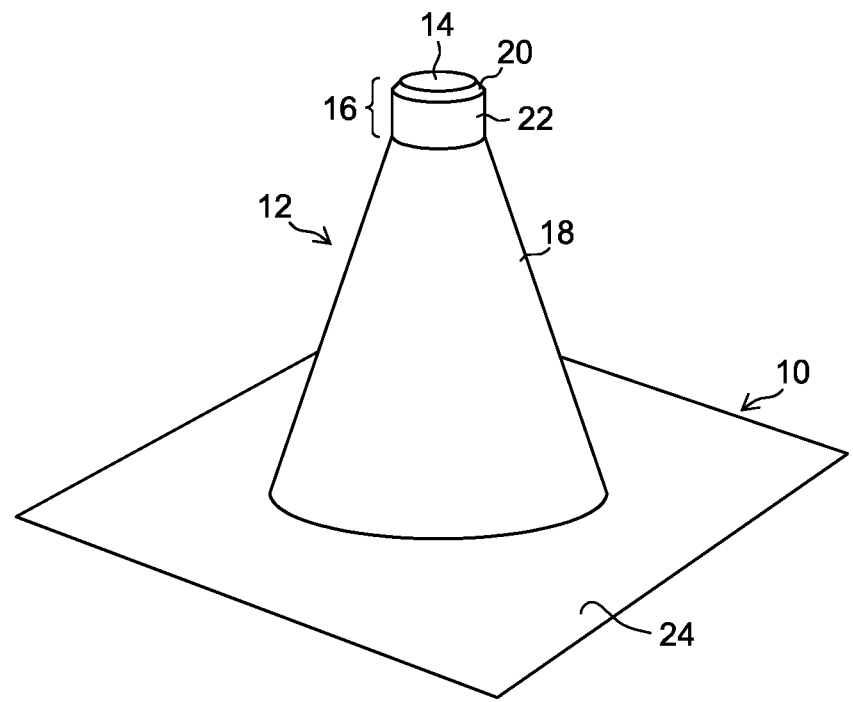
FIG. 1 is a perspective view schematically illustrating an image of a relief (a projection or a projecting portion formed as a relief) formed on a flexo printing plate according to an embodiment of the presently disclosed subject matter.

FIG. 1 is a perspective view schematically illustrating an image of a relief (a projecting portion formed as a relief) formed on a flexo printing plate according to an embodiment of the presently disclosed subject matter. On a flexo printing plate 10 according to the present embodiment, a relief 12 having a three-dimensional shape as illustrated in the drawing is formed as a relief projecting portion. This relief 12 has a cap part 16 to which ink is provided to a top face 14 thereof, and a frustum part 18 serving as a base that supports the cap part 16. While an example is illustrated in FIG. 1 in which the cap part 16 having a substantially columnar shape is formed on the frustum part 18 having a truncated cone shape, the stereoscopic shapes of the frustum part 18 and the cap part 16 are not restricted to the example illustrated in the drawing. Note that in the description of the present embodiment, upward and downward directions are represented with the top face 14 of the relief 12 being on an "upper" side and a surface of a bottom 24 of the relief 12 being on a "lower" side. Also, description is made on the assumption that the flexo printing plate 10 is supported on a support face (not illustrated) parallel to a horizontal plane orthogonal to a gravitational direction.

As illustrated in FIG. 1, the top face 14 of the cap part 16 in the relief 12 is formed as a flat part parallel to the horizontal plane. The shape of the top face 14 of the cap part 16 (the shape in a planar view) is not restricted to a circular shape, and can be any shape, such as an oval shape or a polygonal shape. The top face 14 of the cap part 16 has its edge (flange) portion chamfered, forming a smooth inclined surface (denoted by a reference numeral 20). In the specification, the chamfered portion denoted by this reference numeral 20 is called a "cap chamfered part".

While an example is illustrated in FIG. 1 in which the entire perimeter of the edge of the top face 14 is chamfered, the chamfered part is not necessarily restricted to the entire perimeter. In another example, only a part of the edge can be chamfered and a part can be left without being chamfered.

The cap part 16 is shaped so that a portion lower than the cap chamfered part 20 has a side surface with a steep gradient nearly perpendicular to the top face 14. That is, the cap part 16 has a horizontal cross section with an approximately constant cross sectional area irrespectively of the height of the cross section, except for the cap chamfered part 20. A portion having a side surface standing at a steep angle nearly perpendicular to this horizontal plane (the top face 14) is called a "cap steep part" (denoted by a reference numeral 22) in the specification.

The "nearly-perpendicular steep angle" is an angle in a range of 70 degrees or more and 90 degrees or less, for example. An angle nearer perpendicularity (90 degrees) is more preferable. The angle is not necessarily required to be strictly perpendicular (90 degrees) under constraints of an actual processing process and others. And, there is a tolerance in a range in which equivalent operation and effect can be obtained in practice. A preferable nearly-perpendicular steep angle is preferably 75 degrees or more and 90 degrees or less, more preferably 80 degrees or more and 90 degrees or less.

On the other hand, the frustum part 18 supporting the cap part 16 has a shape, as a whole, widening from a base part (a root) of the cap part 16 toward the bottom (a bottom part) of the relief 12 (a shape tapered from the bottom to the cap part 16). A lower cross sectional area of the horizontal cross section is larger (an upper cross sectional area of the horizontal cross section is smaller). For example, the base portion can be shaped in an elliptic truncated cone, a truncated pyramid, or the like.

Figure 2:
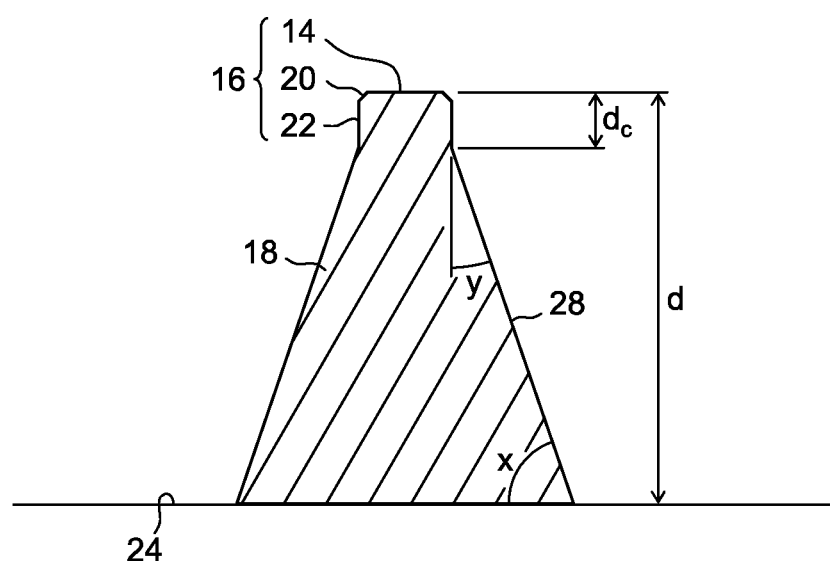
FIG. 2 is a longitudinal cross sectional view of the relief illustrated in FIG. 1.

FIG. 2 is a longitudinal cross sectional view of the relief 12 illustrated in FIG. 1 (a cross sectional view illustrating the shape of a cross section cut along a cut surface crossing perpendicularly to the top face 14). As illustrated in FIG. 2, in the shape of the longitudinal cross section of the relief 12 of FIG. 1, the cap part 16 has a substantially rectangular shape. The cap part 16 includes the horizontal top face 14 and the cap steep part 22 forming a side surface at a steep angle nearly perpendicular to this top face 14. Also, the top face 14 of the cap part 16 has an edge formed in a chamfered inclined surface (denoted by a reference numeral 20).

In the case of the flexo printing plate, it is preferable that a maximum value of a depth d from the top face 14 of the relief 12 to the bottom 24 be approximately 500 μm and the height of the cap part 16 (a depth dc from the top face 14) be approximately 40 μm (approximately 10% or more or less of a maximum depth dmax).

The frustum part 18 supporting the cap part 16 has a longitudinal cross section in a trapezoidal shape. A side surface 28 of the frustum part 18 is an inclined surface with a gentle gradient compared with the cap steep part 22. A tilt angle x of the inclined surface portion (denoted by the reference numeral 28) of the frustum part 18 can be designed as appropriate. Here, with reference to the bottom surface of the bottom 24, an angle of elevation of the inclined surface is set as the tilt angle x. Alternatively, a tilt angle y may be defined with reference to a vertical plane perpendicular to the top face 14. As the area of the top face is smaller, the gradient (the tile angle x) is set smaller (the slope is set gentler), thereby effectively preventing the projection from falling down. Note that the side surface portion (denoted by the reference numeral 28) in the longitudinal cross section of the frustum part 18 is not restricted to be represented as a diagonal straight line, but can be represented as a curved line.

Figure 3:
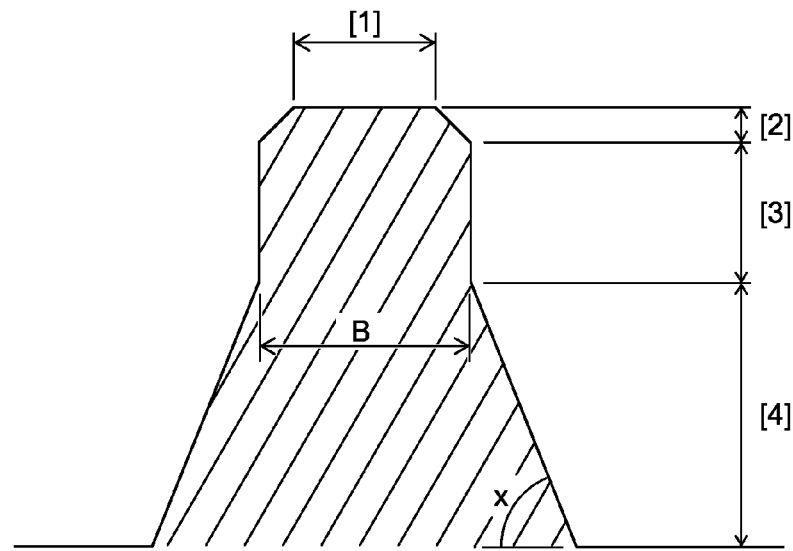
FIG. 3 is a schematic view for laying out names of parts of the relief in the present embodiment.

FIG. 3 is a schematic view for laying out names of parts of the relief (the projection) in the present embodiment. In FIG. 3, a portion indicated by [1] represents the top face 14 portion of the cap part 16. As such, with the top face 14 portion being horizontally formed, an effect can be achieved such that transfer of ink from the roller (the anilox roller) for transferring ink onto the relief printing plate becomes uniform and the amount of ink provided is stabilized.

A portion indicated by [2] corresponds to the cap chamfered part (refer to the reference numeral 20 in FIG. 1 and FIG. 2). In the case of the structure in which the edge of the top face 14 of the cap part 16 is not chamfered, the cap part is disadvantageously deformed by printing to thicken lines and dots after printing. According to this embodiment, by adopting the structure in which the edge of the top face 14 of the cap part 16 is chamfered, an operation and effect can be obtained such that image lines and image dots (halftone dots) are not thickened by the ink transferred to the printing body even if the cap part 16 is deformed by printing pressure.

The cap chamfered part 20 is preferably formed in a range of 5 μm or more and 20 μM or less.

A portion indicated by [3] corresponds to the cap steep part (refer to the reference numeral 22 in FIG. 1 and FIG. 2). The thickness of the cap steep part 22 (an area B in a horizontal cross sectional shape) is larger than an area A left as the top face 14 of the relief 12 (an area of the top face after chamfering, which is hereinafter referred to as a "top face area").

The cap part 16 including the cap chamfered part indicated by [2] and the cap steep part indicated by [3] in FIG. 3 is preferably formed in a range of 10 μm or more and 40 μm or less from the top face 14 in a depth direction.

The above-described cap steep part 22 is provided because of the following reason. For example, if an inclined mountainous shape like a frustum shape is adopted for the cap part 16, the amount of pressing in a vertical direction varies depending on the magnitude of printing pressure, and an increase in thickness of dots varies according to the magnitude of the amount of pressing (the magnitude of printing pressure). In particular, since the printing pressure varies depending on the printing machine, the type of a base material, printing conditions, and others, the cap part 16 is preferably configured to have the cap steep part 22 formed at a nearly-perpendicular steep angle from the top face 14.

A portion indicated by [4] corresponds to the frustum part (refer to the reference numeral 18 in FIG. 1 and FIG. 2). If the side surface of the frustum part 18 is still perpendicular, the relief on the plate is disadvantageously prone to fall down by printing pressure. In view of preventing the projection from falling down as described above, the frustum part 18 preferably has an inclined shape widening toward the bottom 24. The gradient of the side surface of the frustum part 18 is preferably in a range of 50 degrees or more and 70 degrees or less.

Figure 4:
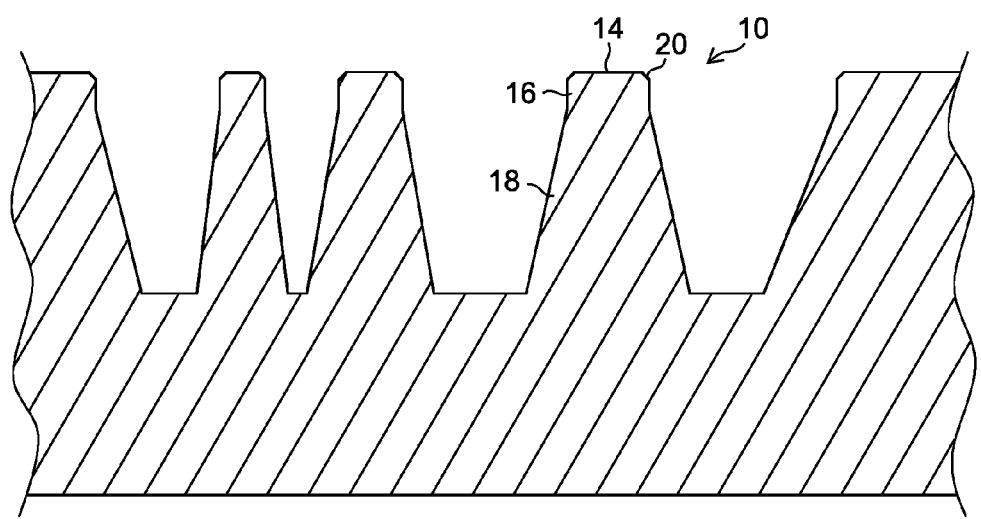
FIG. 4 is a view of an example of the cross section of the flexo printing plate according to the present embodiment.

FIG. 4 is a view of an example of the cross section of the flexo printing plate 10. As illustrated in the drawing, many projections are formed on the flexo printing plate 10. The edge of the top face 14 of each projection is chamfered.

By using this printing plate, an increase in thickness of dots by printing pressure is reduced. Also, ink pressed from the top face 14 to the surroundings by printing pressure flows to a portion along the chamfered inclined surface of the cap chamfered part 20, thereby also suppressing a marginal phenomenon.

<Method of Manufacturing Flexo Printing Plate>

Next, a creating apparatus (a plate-making apparatus) for creating the flexo printing plate 10 (corresponding to the "relief printing plate") described above and its manufacturing method are described.

<Structure of Flexo Engraving CTP System>

Figure 5:
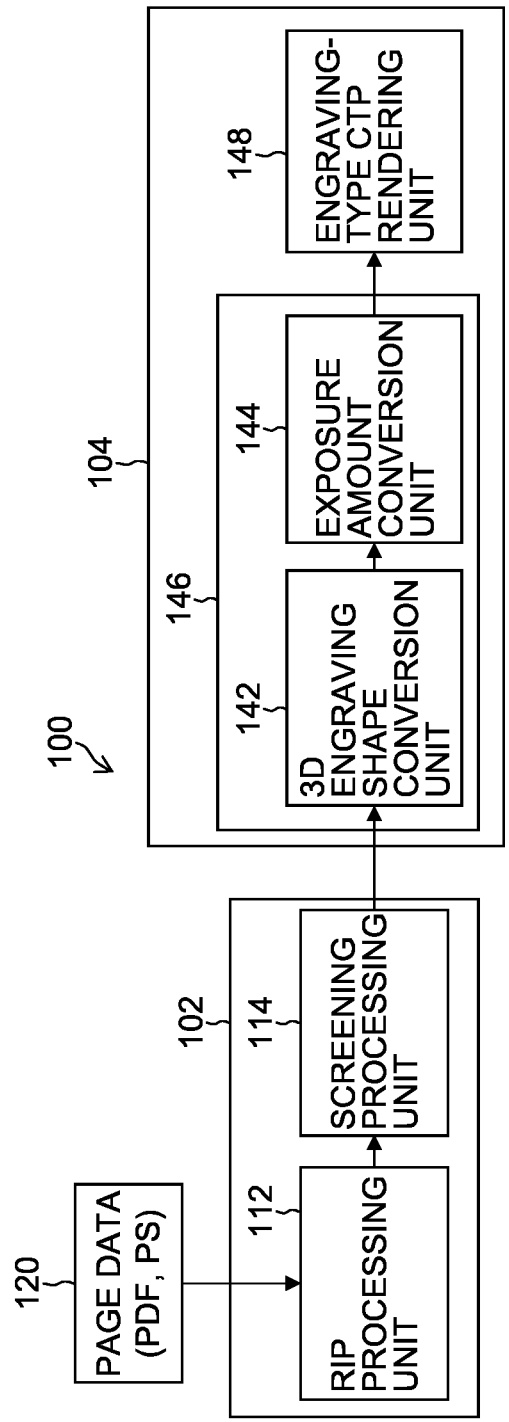
FIG. 5 is a block diagram of an entire structure of a flexo engraving CTP system according to the present embodiment.

FIG. 5 is a block diagram of an entire structure of a flexo engraving CTP (computer to plate) system. This plate-making system 100 (corresponding to a relief printing plate creating apparatus") mainly includes a RIP (Raster Image Processor) apparatus 102 and a relief plate creating apparatus (a setter apparatus) 104.

The RIP apparatus 102 includes a RIP processing unit 112 and a screening processing unit (a binary image data generation unit) 114. The RIP processing unit 112 is a conversion processing unit that converts Page Description Language data (hereinafter referred to as "page data") 120, such as PDF (Portable Document Format) data or PS (Post Script, registered trademark of Japan) data representing a vector image of a printing document edited by using a computer or the like, to raster image data Ir.

Each piece of image data (each piece of pixel data) Ii configuring the raster image data Ir can normally adopt, for example, eight bits in each of four channels of CMYK, that is, 256 (0 to 255) levels of grayscale. In the present embodiment, for convenience of understanding, it is assumed that 256 (0 to 255) levels of grayscale have been converted to 0% to 100% of a halftone dot area ratio Har. That is, the image data Ii converted to the halftone dot area ratio takes any value of 0 to 100 as a grayscale value. In this case, when the value of the image data Ii=100, a filled-in part is formed. When the value of the image data Ii=0, a non-image part is formed, and a halftone dot projecting part (a projecting part for halftone dot printing or simply referred to as a projecting part) is not formed.

The screening processing unit 114 is a conversion processing unit that converts the raster image data generated by the RIP processing unit 112 to halftone dot image data of a binary value (referred to as "binary halftone dot image data). The screening processing unit 114 performs a screening process on the raster image data Ir under the conditions, such as a previously specified halftone (for example, AM (amplitude modulation) halftone dots, FM (frequency modulation) halftone dots, or a hybrid halftone in combination thereof), a screen angle, and the number of screen lines, to generate binary halftone dot image data. As the screening process, various screening technologies can be applied, such as AM screening, FM screening, and hybrid screening.

The setter apparatus 104 includes an image processing circuit 146 that includes a 3D engraving shape conversion unit 142 converting the binary halftone dot image data generated by the RIP apparatus 102 to three-dimensional (3D) engraving shape data (referred to as "3D engraving shape data") and an exposure amount conversion unit 144 converting the 3D engraving shape data to exposure amount data for laser engraving. Also, the setter apparatus 104 includes an engraving-type CTP rendering unit 148 controlling an output of laser light based on the exposure amount data generated by the image processing circuit 146.

The 3D engraving shape conversion unit 142 creates a 3D shape outside a non-exposure area such as halftone dots and characters, according to parameters specifying the shape of the relief. The binary halftone dot image data generated by the RIP apparatus 102 is binary data of white (0)/black (1), with a pixel at a portion where ink is to be provided being black and with a pixel at a portion where ink is not to be provided (a no-image part) being white. When a relief printing plate reflecting the details of the binary halftone dot image is created by laser engraving, laser light is applied onto the no-image part (a white pixel portion) as a blank part of the plate material for removal processing, and an image part (a black pixel portion) is left as a non-exposure area.

The "binary halftone dot image data" in the present embodiment corresponds to "binary image data" in claims, and the "3D engraving shape data" corresponds to "target stereoscopic shape data".

Figure 6:
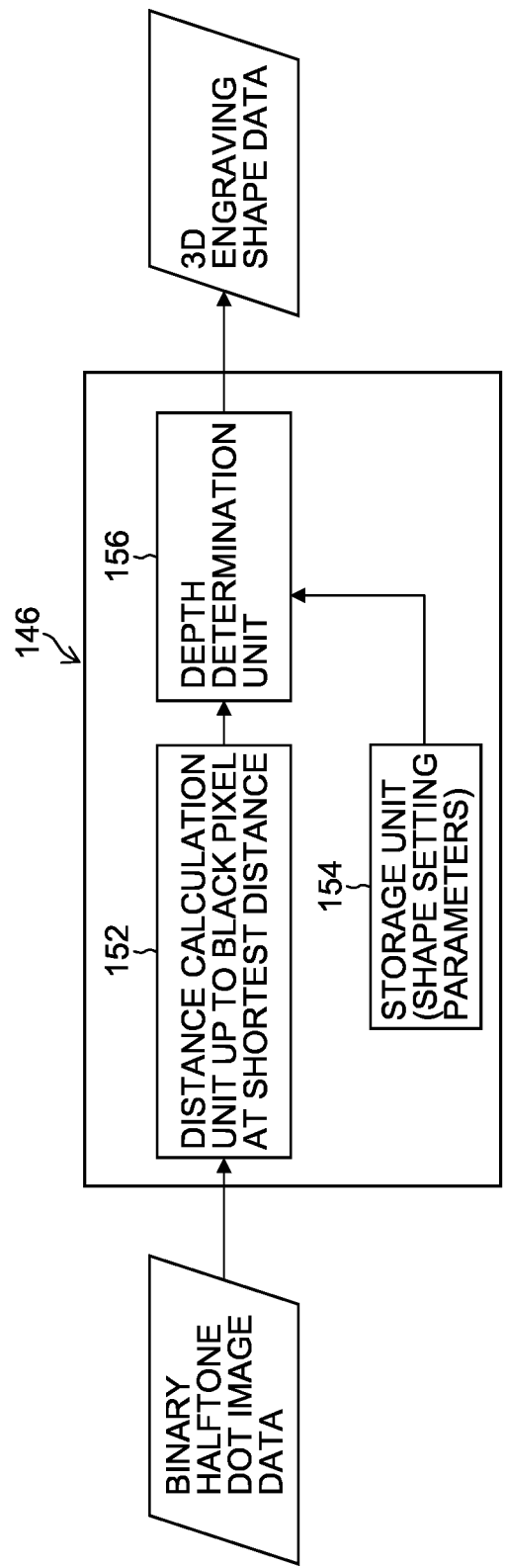
FIG. 6 is a process block diagram of a 3D engraving shape conversion unit.

FIG. 6 is a process block diagram of the 3D engraving shape conversion unit 142. The 3D engraving shape conversion unit 142 includes a distance calculation unit 152 calculating a distance from each pixel of the blank part to a black pixel at the shortest distance, a storage unit 154 storing shape setting parameters, and a depth determination unit 156 obtaining (calculating) an engraving depth from parameters specified according to the value of the distance calculated by the distance calculation unit 152.

Figure 7:
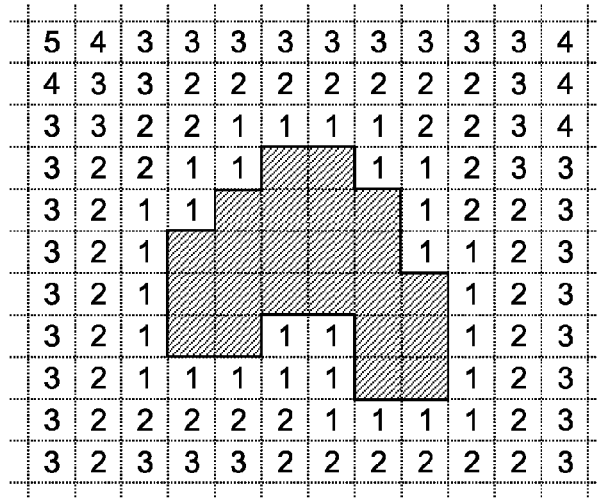
FIG. 7 is an explanatory diagram of an example of a distance calculated by a distance calculation unit.

FIG. 7 illustrates an example of the distance calculated by the distance calculation unit 152. Pixels hatched in black in FIG. 7 are ON pixels in binary image data (also referred to as "black pixels"), and the area of these ON pixels corresponds to an image part. Pixels surrounding the outside of the area of the ON pixels (the image part) form a no-image part corresponding to a blank part. A numerical value indicating a distance from each pixel in the blank part to a black pixel at the shortest distance for each unit is illustrated in each pixel cell. A distance from a white pixel adjacent to a black pixel is represented as "1". For distance calculation, a known distance transform algorithm including a Euclidean distance transform can be used.

Figure 8:
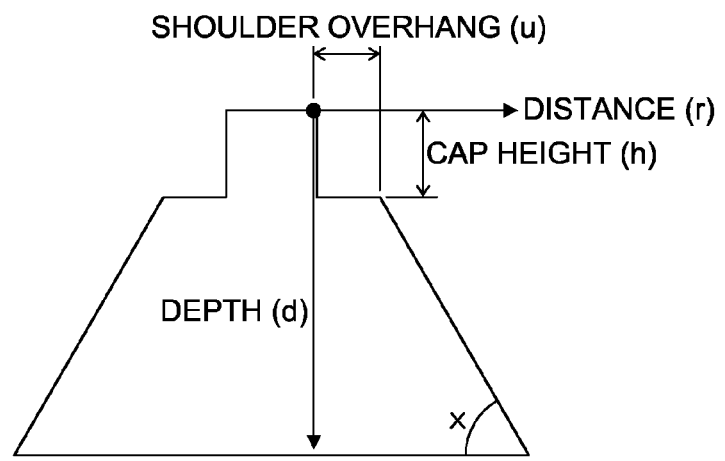
FIG. 8 is a schematic view for describing shape setting parameters.

FIG. 8 is a schematic view of shape setting parameters. As illustrated in FIG. 8, a shape model of a relief projection is defined. Parameters specifying the projecting shape of the relief include, for example, a distance r from an edge of a black pixel in a two-dimensional plane, a relief depth d, a cap height (a depth from the top face) h, a shoulder overhang amount u in the base portion under the cap, and the tilt angle x of the base portion.

By setting numerical values regarding these respective parameters, a target three-dimensional shape can be obtained. In actual engraving, the shape of the relief can be specified by defining a relation between the distance r and the depth d.

As these shape setting parameters, a plurality of types of data groups are retained (held) in association with the types of plate materials. Alternatively, a plurality of types of data groups are retained in association with combinations of the types of plate materials and the types of printing bodies (media). According to the plate material for use or according to the combination of the plate material and the printing body for use, appropriate parameters are automatically set by a plate-making program. Also, an operator (a user) can select, input, or edit a desired parameter via a user interface (not illustrated).

Figure 9:
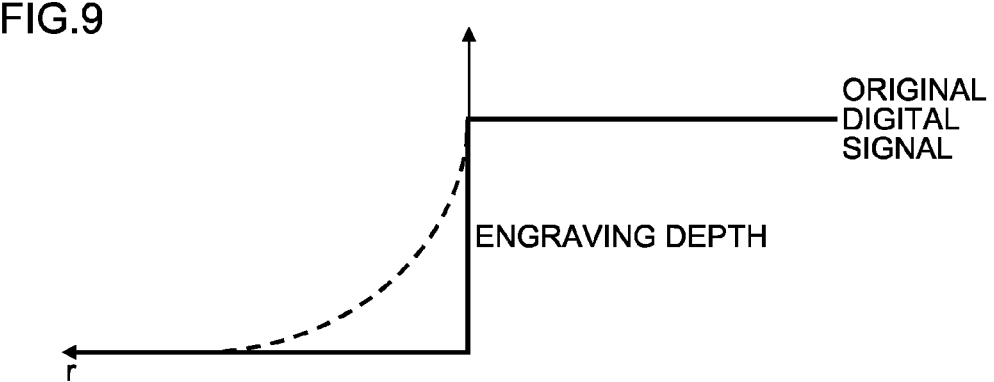
FIG. 9 is a conceptual diagram of a process of determining a three-dimensional engraving shape from the result of distance calculation.

FIG. 9 is a conceptual diagram of a process of determining a three-dimensional engraving shape from the result of distance calculation. The horizontal axis represents a distance from the nearest black pixel (an ON portion of the binary image) in a two-dimensional space (an image plane). The vertical axis represents a binary image signal value and an engraving depth. In an original digital signal of the binary halftone dot image, an image part and a no-image part are switched therebetween in a discrete manner (in a step manner), as indicated by a bold line in FIG. 9.

By contrast, for a blank part (a white pixel) in the two-dimensional space, the engraving shape data is corrected so that the engraving depth is changed according to the distance r from the nearest ON area (black pixel) (refer to a broken line in FIG. 9). This engraving depth data indicated by the broken line is determined according to the shape setting parameters described with reference to FIG. 8. Although, in FIG. 9, the engraving shape indicated by the arc-shaped broken line has been described, the engraving shape is not limited thereto. Engraving shape data corresponding to a relation between the distance r and the depth d defined by the shape parameters is generated.

Figure 10:
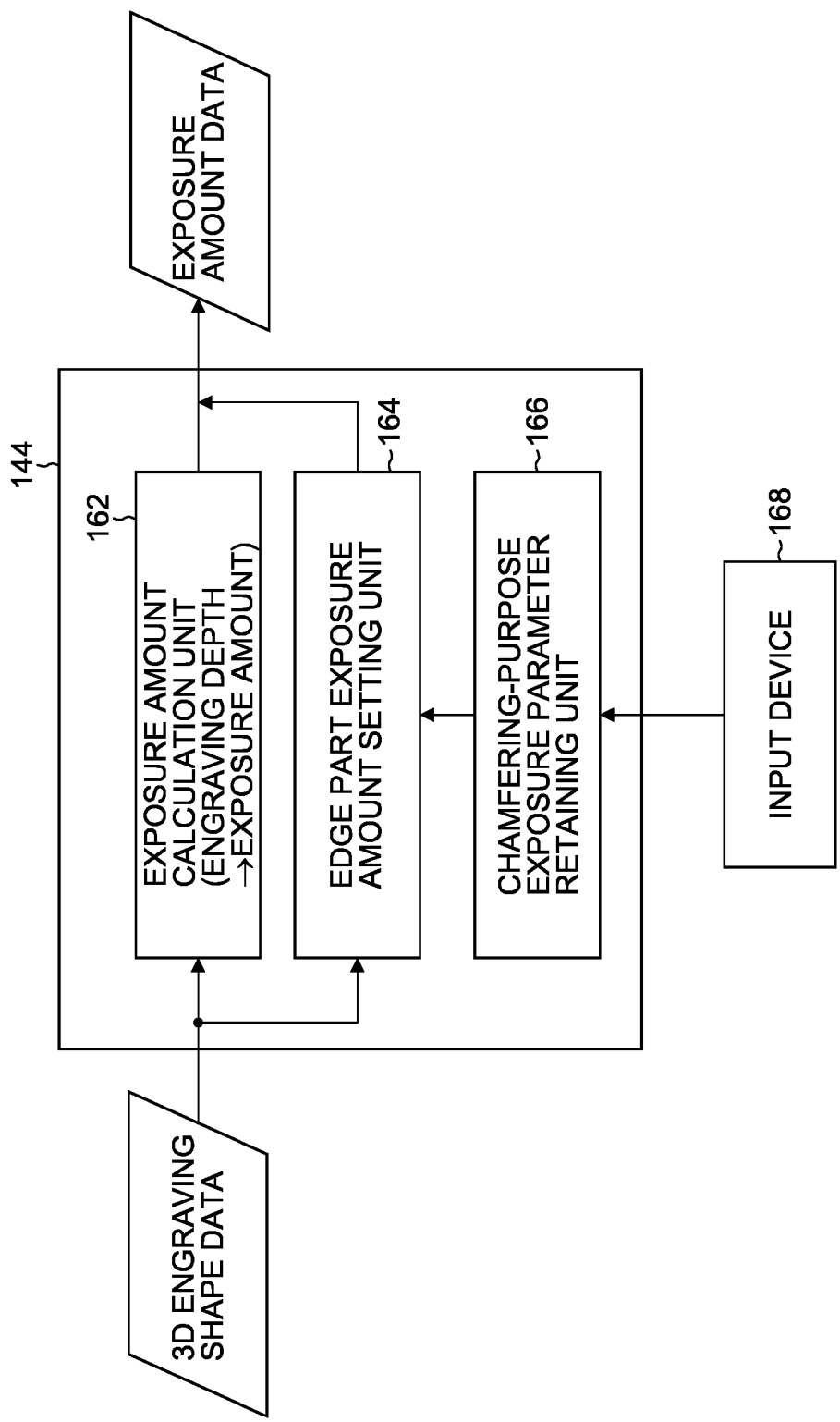
FIG. 10 is a process block diagram of an exposure amount conversion unit.

FIG. 10 is a process block diagram of the exposure amount conversion unit 144. The exposure amount conversion unit 144 includes a processing unit (an exposure amount calculation unit) 162 that converts engraving depth information of 3D engraving data to laser exposure amount data required for engraving; an edge part exposure amount setting unit 164 that provides an exposure amount for chamfering the edge part; and a storage unit (a chamfering-purpose exposure parameter retaining unit 166) that retains data of parameters required for chamfering and exposing the edge part.

The chamfering-purpose exposure parameter retaining unit 166 retains a plurality of types of chamfering-purpose exposure parameters in association with the types of plate materials or, alternatively, retains a plurality of types of chamfering-purpose exposure parameters in association with combinations of the types of plate materials and the types of printing bodies (media). According to the plate material for use or according to the combination of the plate material and the printing body for use, appropriate parameters are automatically selected by a plate-making program. Also, an operator (a user) can select, input, or edit a desired parameter via a user interface (not illustrated). A reference numeral 168 in FIG. 10 denotes an input device as a user interface. As the input device 168, for example, any of various types of structure can be adopted, such as a keyboard, a mouse, a touch panel, an operation button, or any combination thereof. The user can input various instructions through the input device 168, and the details of the instructions can be checked through a display (a display device) not illustrated.

Figure 11:
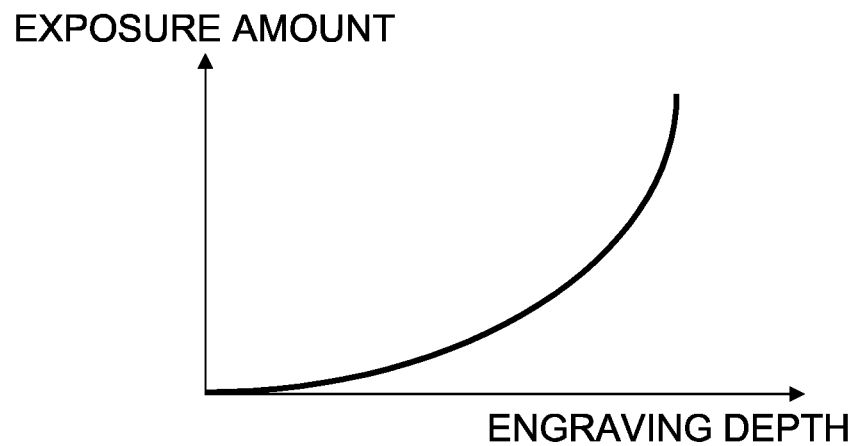
FIG. 11 is an explanatory diagram of a converting process for converting 3D engraving shape data to exposure amount data.

FIG. 11 is an explanatory diagram of a converting process for converting 3D engraving shape data to exposure amount data. In a simplest converting method, for example, as illustrated in FIG. 11, a lookup table defining an exposure amount with respect to an engraving depth is used for conversion. In the exposure amount calculation unit 162 described with reference to FIG. 10, a converting process using the lookup table as illustrated in FIG. 11 is performed.

Note that while description has been made above in which the converting process is performed with such processes, step by step, as a distance from the black pixel→engraving depth→exposure amount, in an actual computing process, a table defining a relation between the distance and the exposure amount is found in advance and, by using this table to perform a converting process once from the distance to an exposure amount, a target conversion result can be obtained.

[Setting Chamfering Exposure Amount of Edge Part]

The process in the edge part exposure amount setting unit 164 illustrated in FIG. 10 is as follows. In the present embodiment, to chamfer the edge portion of the image part (the ON area of the binary halftone dot image), a predetermined exposure amount specified as a parameter is provided to white pixels adjacent to black pixels (a range with a distance from the nearest ON area of "1" in a pixel unit). Specifically, respective surrounding pixels (pixels with a distance of "1") described with reference to FIG. 7 correspond to "outside image adjacent pixels", and the exposure amount specified as a parameter is provided to each of these surrounding pixels. The predetermined exposure amount herein is an exposure amount as an engraving amount achieving a target chamfering amount, and is set smaller than an exposure amount for cutting out the cap steep part 22 and the frustum part 18.

As such, exposure amount data containing data of the exposure amount of the edge part of the ON area and the exposure amount of the no-image part is generated and, based on this exposure amount data, an engraving operation by the engraving-type CTP rendering unit 148 (refer to FIG. 5) is controlled.

The signal processing described with reference to FIG. 5 to FIG. 11 can be achieved by combining hardware and software. For example, the function of the image processing circuit 146 described with reference to FIG. 5 can be achieved also by a computer. In this case, a program for achieving the processing functions of the image processing circuit 146 (including the processing functions described with reference to FIG. 6 and FIG. 10) by the computer is incorporated into the computer.

<Example of Structure of Engraving-Type CTP Rendering Unit>

As the setter apparatus 104 of the present embodiment, for example, a laser engraving machine with a rendering (processing) resolution of 2400 dpi in a two-dimensional plane is adopted. That is, the setter apparatus 104 generates 3D engraving data and exposure amount data with a resolution supporting 2400 dpi. In this case, one pixel on plate data is in the form of a cell of a square approximately 10.6 μm on each side.

Figure 12:
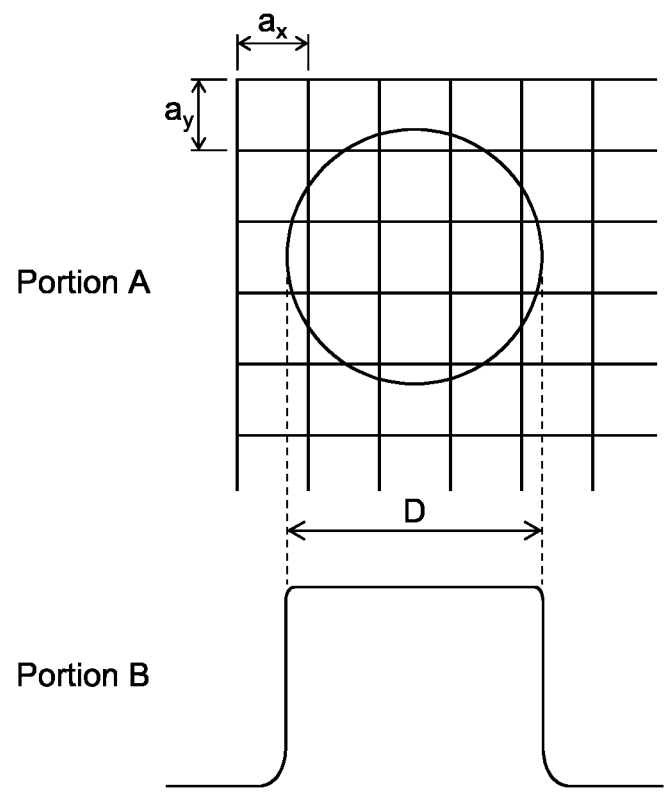
FIG. 12 is an explanatory diagram exemplarily illustrating a relation between a beam diameter of laser light and pixels of binary image data.

FIG. 12 is an explanatory diagram exemplarily illustrating a relation between a beam diameter of laser light applied onto a plate material by a laser engraving machine and pixels of binary image data. A beam diameter D of laser light larger than the length of one side of the pixel defined by the rendering resolution of the laser engraving machine (for example, ax=ay=10.6 μm) can be used. By way of example, the beam diameter D of laser light applied onto the plate material from the laser engraving machine is approximately 35 μm. When the rendering (processing) resolution of the laser engraving machine is 2400 dpi, the pixel size of one pixel has approximately 10.6 μm on each side. That is, the beam diameter D of laser light for use in rendering engraving is larger than the range of one pixel and, as illustrated in Portion A of FIG. 12. And, exposure with laser light is performed over a range including respective surrounding pixels adjacent to a center pixel. Note that, as illustrated in Portion B of FIG. 12, a power distribution of the laser light is approximately constant in the range of the beam diameter D.

The relation between the beam diameter and the pixel size is not restricted to the example described above. While the beam diameter larger than the area of one pixel can be used, the range of outside image adjacent pixels to which the chamfering-purpose exposure amount is to be provided is determined depending on the relation of the beam diameter and the size of one pixel.

<Exposure Control Method>

Figure 13:
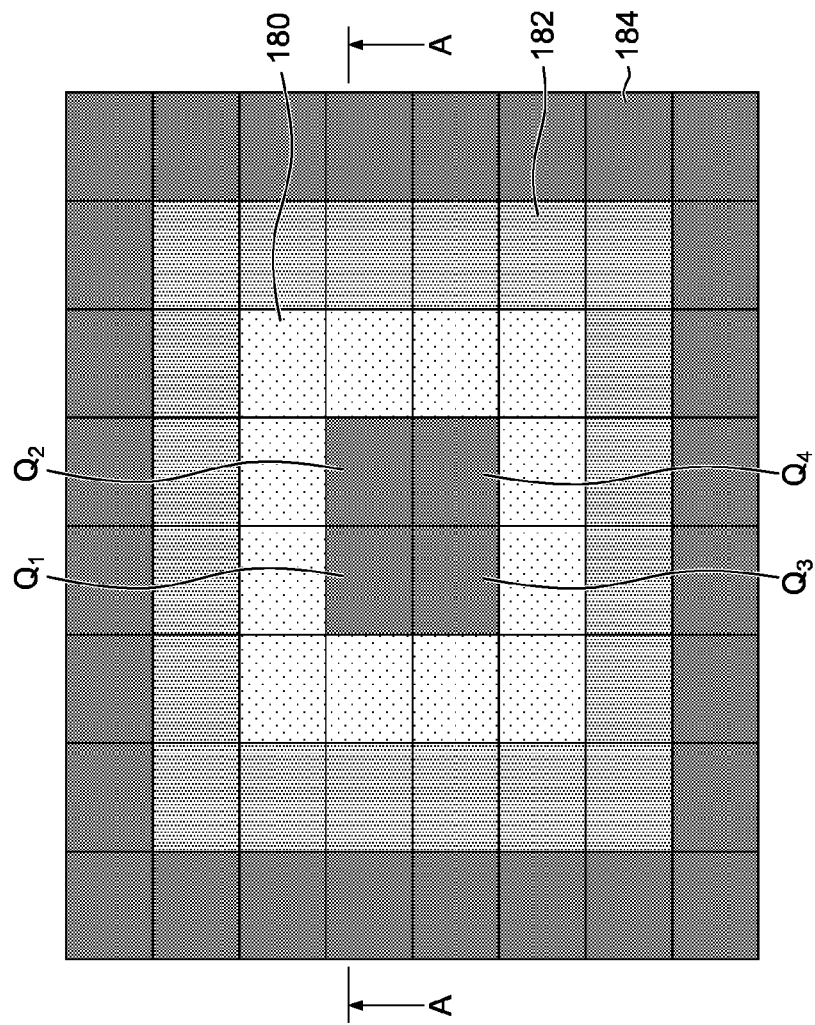
FIG. 13 is an explanatory diagram of light power control when a rectangular halftone dot projecting part in a planar view is formed.

Next, a laser exposure control method according to the present embodiment is described. FIG. 13 is an explanatory diagram of light power control when a rectangular halftone dot projecting part in a planar view is formed. Here, the case is exemplarily described in which a rectangular projection is formed by taking center adjacent four pixels (Q1, Q2, Q3, and Q4) as ON pixels (black pixels) of a binary image on exposure amount data.

In this example, an outside image edge range formed of each adjacent pixel over the entire perimeter of the rectangular projection formed of these four pixels (a most adjacent area formed of twelve pixels with a light dot screen denoted by a reference numeral 180 in the drawing) is provided with a relatively small amount of exposure power (a predetermined subtle exposure amount corresponding to chamfering). Then, for a range formed of each surrounding adjacent pixel over the entire perimeter further outside of the outside image edge range (an adjacent area formed of twenty pixels with a dense dot screen denoted by a reference numeral 182 in the drawing), the optical power is relatively increased for engraving.

Figure 14:
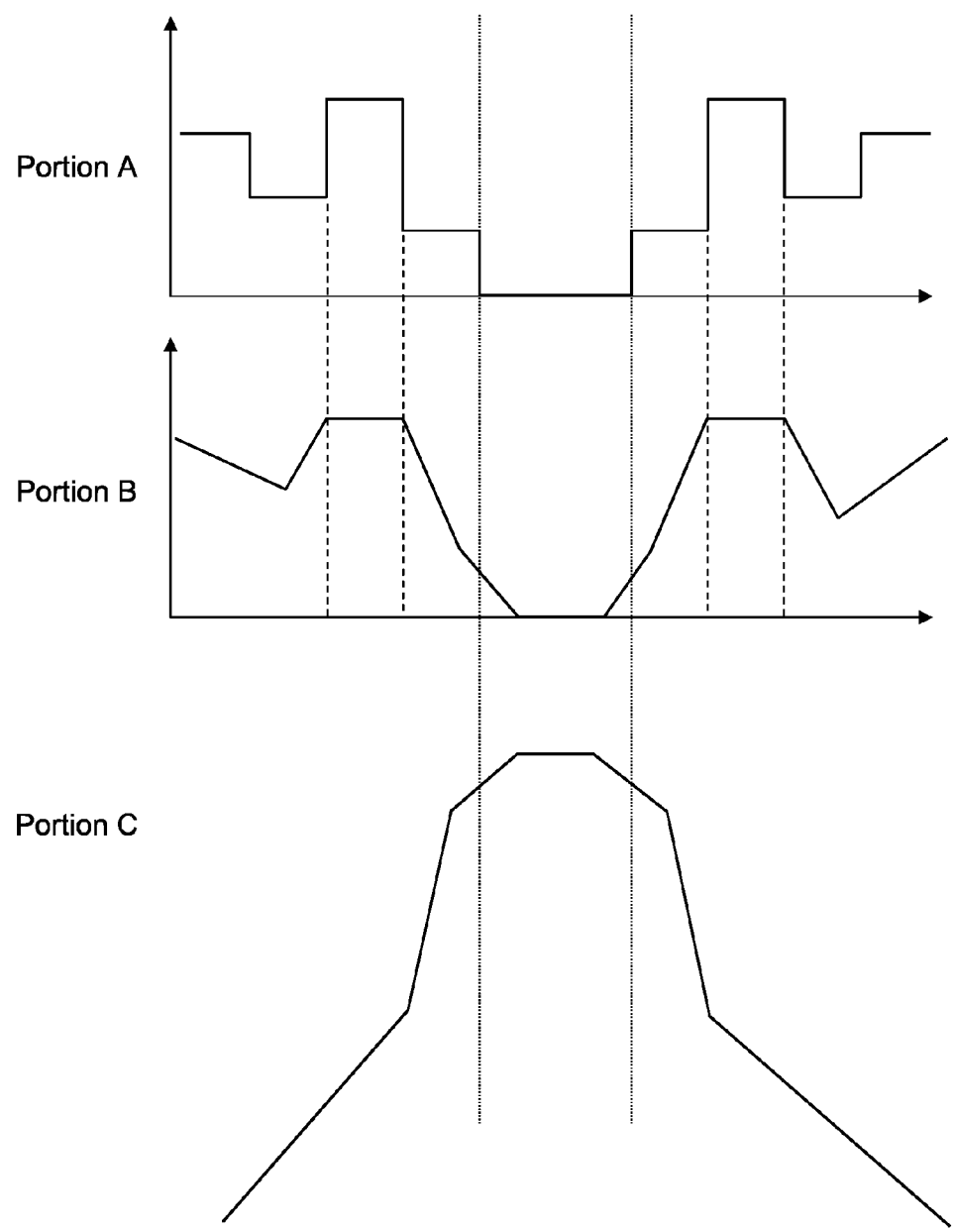
FIG. 14 includes Portion A illustrating a pixel exposure amount signal of a laser beam, Portion B being a graph illustrating accumulated energy of light power of a laser beam applied onto a plate material according to the exposure amount signal illustrated in Portion A on a cross section along an A-A line in FIG. 13, and Portion C schematically illustrating a cross sectional shape of a projection formed on the plate along the A-A line in FIG. 13.

In FIG. 14, Portion A illustrates a pixel exposure amount signal of a laser beam, Portion B is a graph illustrating accumulated energy of light power of a laser beam applied onto the plate material according to the exposure amount signal illustrated in Portion A on a cross section along an A-A line in FIG. 13, and Portion C schematically illustrates a cross sectional shape of a projection formed on the plate along the A-A line in FIG. 13.

As illustrated in Portion A of FIG. 14, by providing a small exposure amount to the most adjacent edge area bordering the black pixels Q1, Q2, Q3, and Q4 (a range of the respective surrounding pixels denoted by the reference numeral 180 in FIG. 13), a chamfered shape can be formed on the edge portion of the top face (refer to Portion C of FIG. 14). Since the beam diameter of laser light for engraving is larger than one pixel, laser light is also applied to the inside of the rectangular area formed of the black pixels Q1, Q2, Q3, and Q4 in a range of the beam diameter. For this reason, a portion inside the flange of the original ON area (the rectangular area) is partially exposed to be removed. Therefore, the area of the top part smaller than the area of the original ON area is achieved (refer to Portion C of FIG. 14).

Furthermore, by engraving with a relatively large exposure amount in the pixel area denoted by the reference numeral 182 in FIG. 13, a steep side surface corresponding to the cap steep part 22 is formed. Still further, for the range of the surrounding pixels denoted by the reference numeral 184 further outside the pixel area denoted by the reference numeral 182 in FIG. 13, engraving is performed with an exposure amount of light power relatively smaller than that of the pixel area denoted by the reference numeral 182 to form a portion corresponding to the frustum part 18 (refer to Portion C of FIG. 14).

<Example of Structure of Laser Engraving Machine>

Next, an example of structure of a plate-making apparatus using a laser engraving machine of a multibeam scanning exposure type is described as an example of the engraving-type CTP rendering unit 148.

Figure 15:
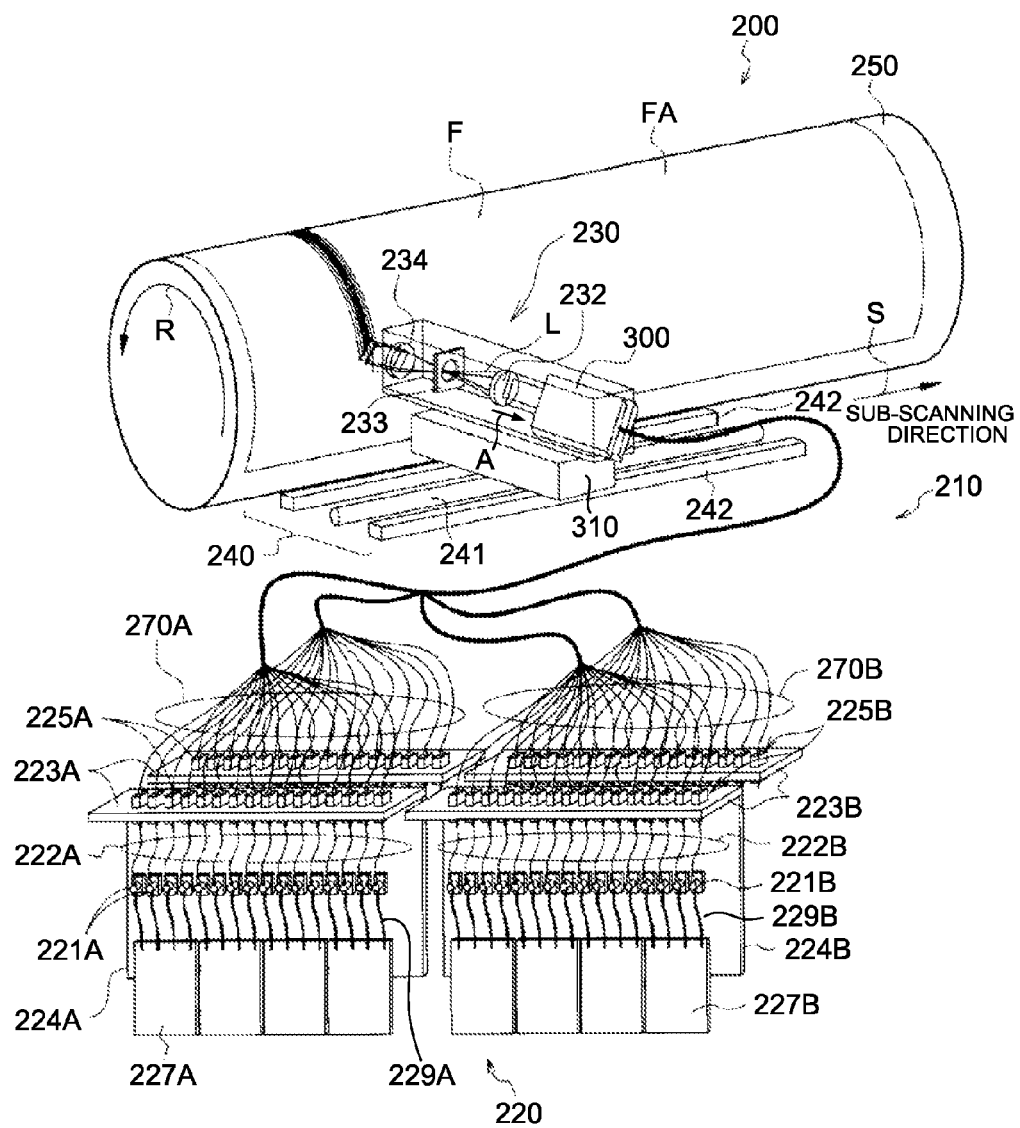
FIG. 15 is a perspective view of the structure of a plate-making apparatus in the present embodiment.

FIG. 15 is a perspective view of the structure of a plate-making apparatus 200 according to the present embodiment. In the plate-making apparatus 200 of this example, a sheet-like plate material F (also referred to as a "recording plate") is fixed around an outer circumferential surface of a drum 250 having a cylindrical shape. The drum 250 is rotated in a direction indicted by an arrow R in FIG. 15 (a main scanning direction). Also, from an exposure head 230 of a laser recording device 210 toward the plate material F, a plurality of laser beams are ejected according to image data of an image to be engraved (recorded) on the plate material F, and scanning is made with the exposure head 230 at a predetermined pitch in a sub-scanning direction (a direction indicated by an arrow S in FIG. 15) orthogonal to the main scanning direction, thereby engraving a two-dimensional image on the surface of the plate material F at high speed to make a relief printing plate. Here, the case is exemplarily described in which a rubber plate or resin plate for flexo printing is used for engraving.

The laser recording device 210 to be used for the plate-making apparatus 200 of this example includes a light source unit 220 generating a plurality of laser beams, the exposure head 230 applying the plurality of laser beams generated by the light source unit 220 onto the plate material F, and an exposure head moving part 240 moving the exposure head 230 along the sub-scanning direction. Note that the rotating direction R of the drum 250 is taken as the main scanning direction, and the direction indicated by the arrow S in which the exposure head 230 moves along an axial direction (a longitudinal direction) of the drum 250 is taken as the sub-scanning direction.

The light source unit 220 includes a plurality of semiconductor lasers 221A and 221B (here, 64 in total). Light beams from the semiconductor lasers 221A and 221B are individually transmitted via optical fibers 222A and 222B, and 270A and 270B, respectively, to an optical fiber array unit 300 of the exposure head 230.

In this example, broad area semiconductor lasers (wavelength: 915 nm) are used as the semiconductor lasers 221A and 221B. These semiconductor lasers 221A and 221B are arranged in a line on light source substrates 224A and 224B, respectively. The semiconductor lasers 221A and 221B are individually coupled to one end of the optical fibers 222A and 222B, respectively, and the other ends of the optical fibers 222A and 222B are connected to adaptors of SC-type optical connectors (Single fiber Coupling optical fiber connector) 225A and 225B, respectively.

Adaptor substrates 223A and 223B supporting the SC-type optical connectors 225A and 225B are vertically mounted on one end of the light source substrates 224A and 224B, respectively. Also, on the other ends of the light source substrates 224A and 224B, LD driver substrates 227A and 227B having incorporated thereon LD driver circuits (not illustrated in FIG. 15 and denoted by a reference numeral 226 in FIG. 21) driving the semiconductor lasers 221A and 221B are mounted, respectively. The semiconductor lasers 221A and 221B are individually connected to the corresponding LD driver circuits via wiring members 229A and 229B, respectively. The semiconductor lasers 221A and 221B are individually driven and controlled.

Note that, to achieve high power of the laser beams, multimode optical fibers are applied to the optical fibers 270A and 270B in the present embodiment. Specifically, in the present embodiment, an optical fiber having a core diameter of 105 μm is used. Also, as the semiconductor lasers 221A and 221B, those having a maximum output on the order of 10 W are used. Specifically, for example, products (6397-L3) sold by a JDS Uniphase Corporation having a core diameter of 105 μm and an output of 8.5 W can be adopted.

On the other hand, the exposure head 230 includes the optical fiber array unit 300 (refer to FIG. 16) collectively ejecting the laser beams ejected from the plurality of semiconductor lasers 221A and 221B. To this optical fiber array unit 300, the laser beams ejected from the semiconductor lasers 221A and 221B are transmitted via the plurality of optical fibers 270A and 270B connected to the SC-type optical connectors 225A and 225B connected to the adaptor substrates 223A and 223B, respectively.

Also, in the exposure head 230, a collimator lens 232, an opening member 233, and an imaging lens 234 are arranged in this order from a light ejecting side of the optical fiber array unit 300. The combination of the collimator lens 232 and the imaging lens 234 forms an imaging optical system. The opening member 233 is arranged so that its opening is at a Far Field position when viewed from an optical fiber array unit 300 side. With this, a light amount restricting effect can be equally provided to all laser beams ejected from the optical fiber array unit 300.

The exposure head moving part 240 includes a ball screw 241 and two rails 242 arranged so that their longitudinal direction is along the sub-scanning direction. By activating a sub-scanning motor (not illustrated in FIG. 15 and denoted by a reference numeral 243 in FIG. 21) driving the ball screw 241 by rotation, the exposure head 230 arranged on the ball screw 241 can be moved in the sub-scanning direction as being guided by the rails 242. Also, by activating a main scanning motor (not illustrated in FIG. 15 and denoted by a reference numeral 251 in FIG. 21), the drum 250 can be driven in the direction indicated by the arrow R in FIG. 15 by rotation, thereby achieving main scanning.

Figure 16:
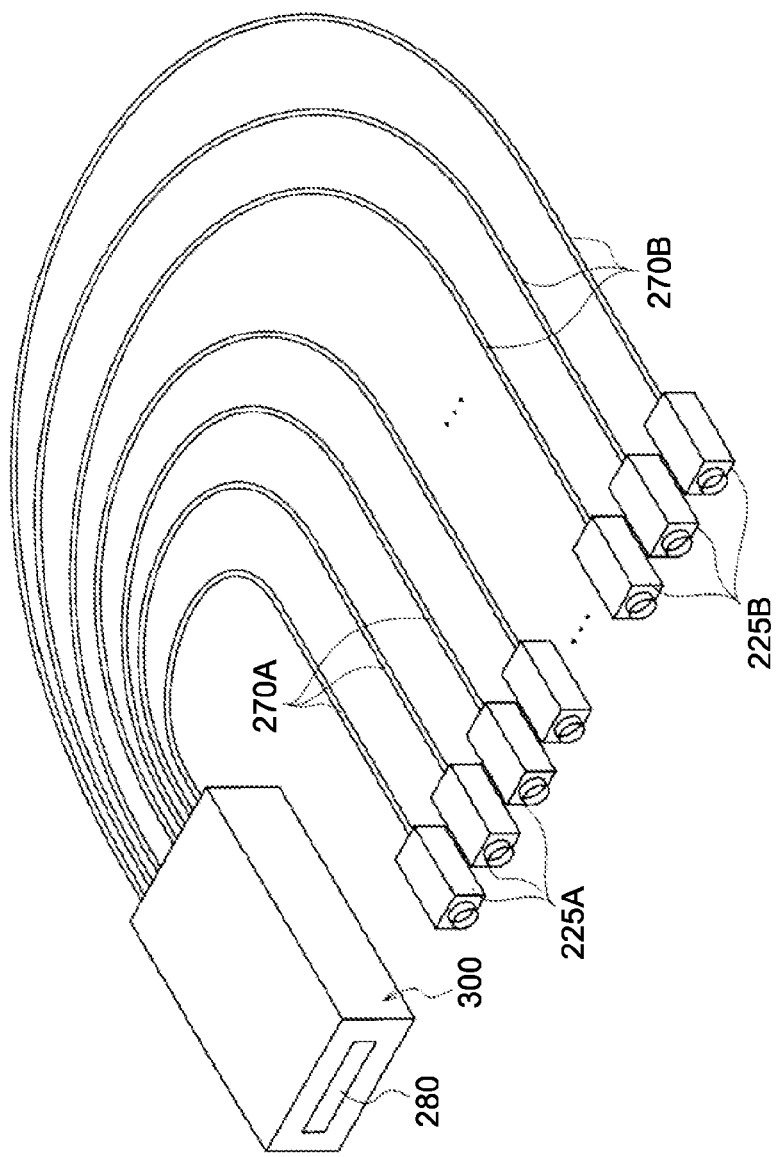
FIG. 16 is a structural view of an optical fiber array unit.
Figure 17:
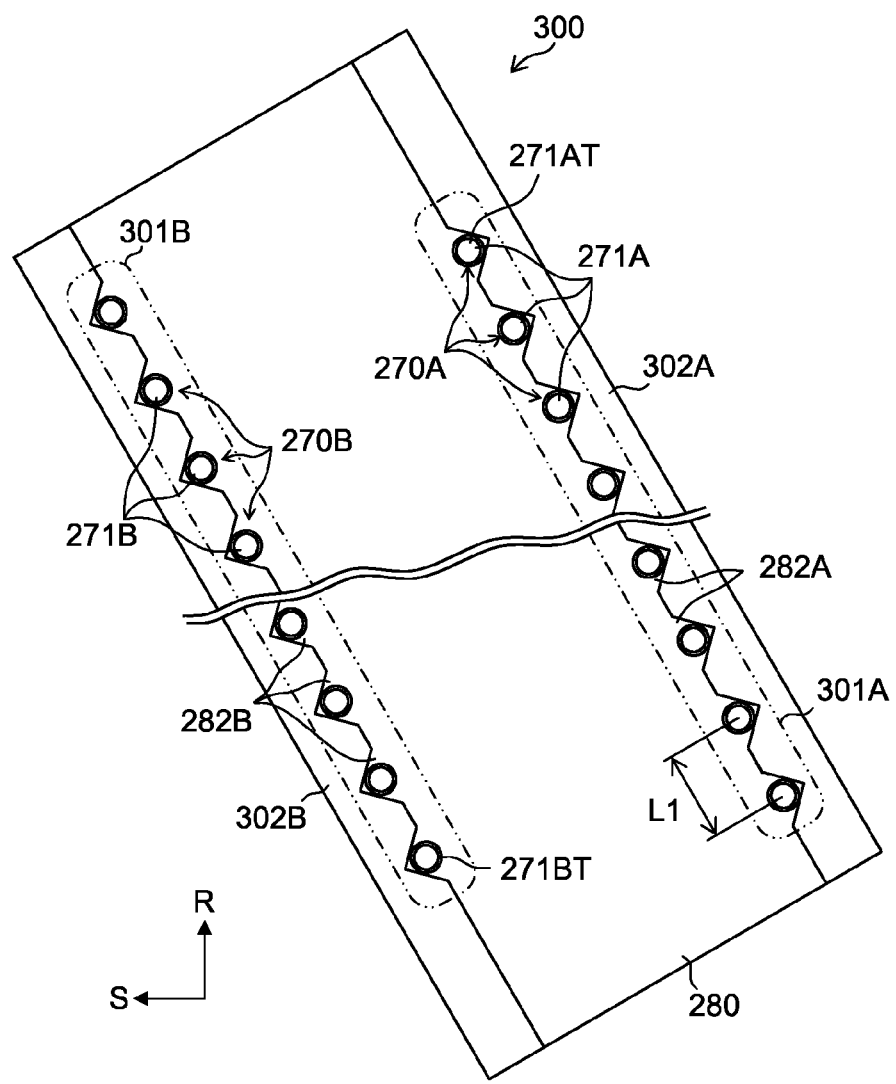
FIG. 17 is an enlarged view of a light emitting part of the optical fiber array unit.

FIG. 16 is a structural view of the optical fiber array unit 300, and FIG. 17 is an enlarged view of a light emitting part 280 of the optical fiber array unit 300 (a view viewed in a direction indicated by an arrow A in FIG. 15). As illustrated in FIG. 17, the light emitting part 280 of the optical fiber array unit 300 has two bases 302A and 302B. On the bases 302A and 302B, V-shaped grooves 282A and 282B as many as the number of the semiconductor lasers 221A and 221B, that is, thirty-two grooves each, are formed on one side with a predetermined space apart from each other. The bases 302A and 302B are arranged so that the V-shaped grooves 282A and 282B face each other.

An optical fiber end 271A, which is the other end of the optical fiber 270A, fits in each V-shaped groove 282A of the base 302A one by one. Similarly, an optical fiber end 271B, which is the other end of the optical fiber 270B, fits in each V-shaped groove 282B of the base 302B one by one. Therefore, it is possible to simultaneously eject a plurality of laser beams (e.g. sixty-four (32×2) laser beams in the present embodiment) ejected from the semiconductor lasers 221A and 221B, from the light emitting part 280 of the optical fiber array unit 300.

That is, the optical fiber array unit 300 of the present embodiment is configured in a manner such that optical fiber end groups 301A and 301B configured with the plurality of (32×2=64 in total in the present embodiment) optical fiber ends 271A and 271B linearly arranged in a predetermined direction are provided in two rows parallel to a direction orthogonal to the predetermined direction.

Figure 18:
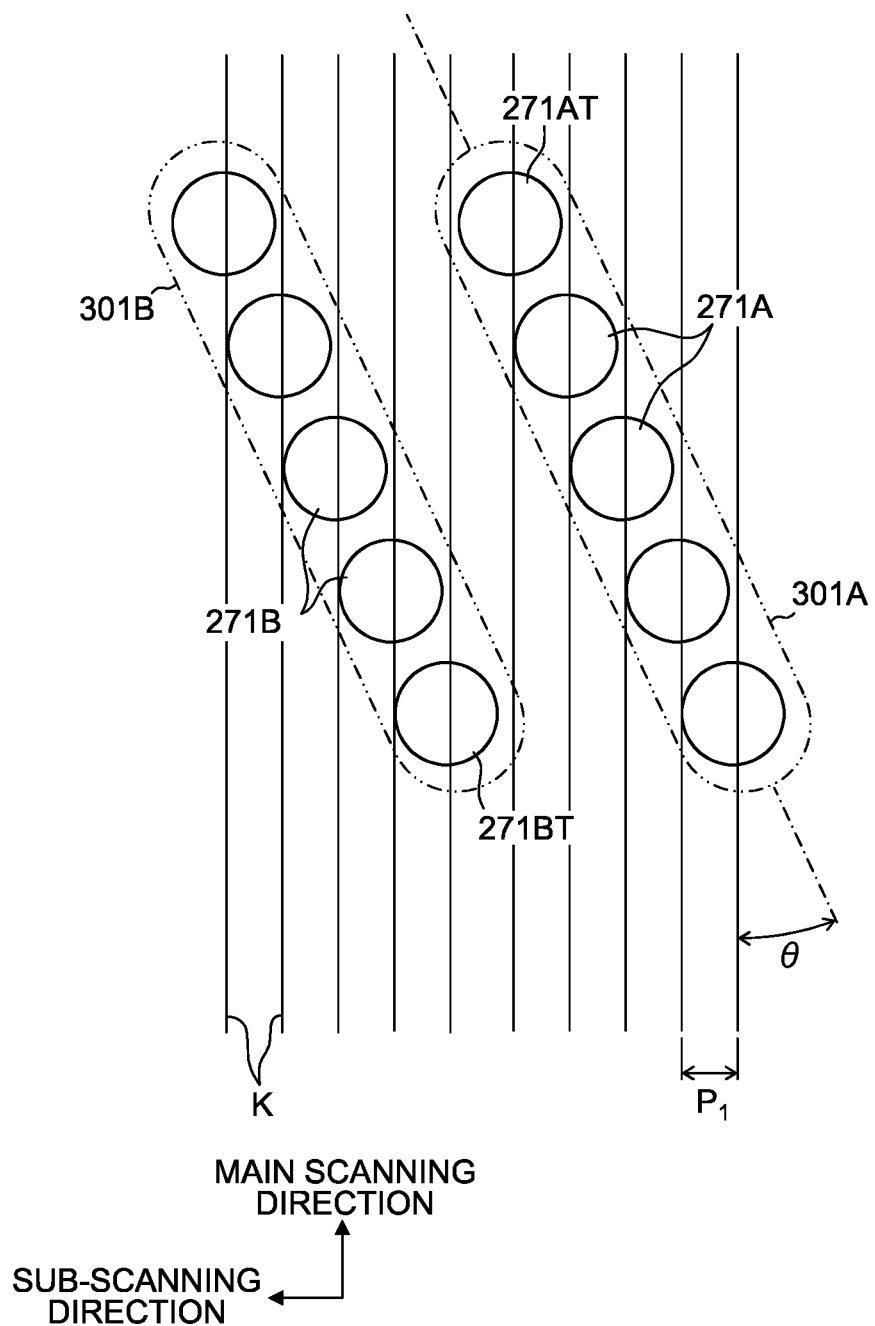
FIG. 18 is an explanatory diagram for describing arrangement positions of optical fiber ends and scanning lines.

As illustrated in FIG. 15 and FIG. 17, in the laser recording device 210 according to the present embodiment the above-described optical fiber array unit 300 (the exposure head 230) is in a state in which the predetermined direction is tilted with respect to the sub-scanning direction. Also, as illustrated in FIG. 17 and FIG. 18, when the optical fiber array unit 300 is viewed in the main scanning direction, the optical fiber end group 301A and the optical fiber end group 301B are arranged so as to be aligned without overlapping each other in the sub-scanning direction. The structure is such that next to an optical fiber end 271AT, which is an end of a fiber arrangement (an arrangement sequence) of the optical fiber end group 301A (at a left end in FIG. 18), an optical fiber end 271BT, which is an end of a fiber arrangement of the optical fiber end group 301B (at a right end in FIG. 18) comes. Note that, for ease of understanding, the number of optical fiber ends 271A and 271B illustrated are less than the actual number.

Figure 19:
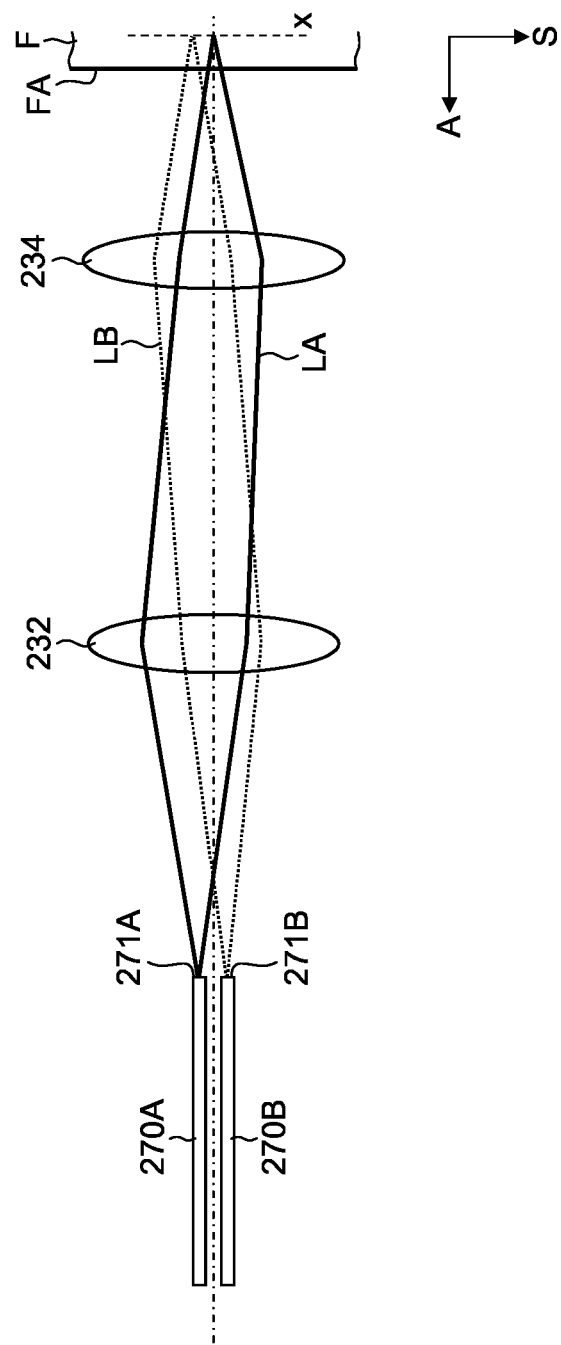
FIG. 19 is a general view of an imaging system of the optical fiber array unit.

FIG. 19 is a general view of the imaging system of the optical fiber array unit 300. As illustrated in FIG. 19, with imaging means configured of the collimator lens 232 and the imaging lens 234, an image is formed from the laser beams, near an exposure plane (surface) FA of the plate material F. Note that the opening member 233 described with reference to FIG. 15 is not illustrated in FIG. 19.

In the present embodiment, an imaging position X is desirably set on the exposure plane FA in view of reproducibility of fine lines and others. A laser beam ejected from the optical fiber end 271A (the optical fiber end group 301A) is taken as a laser beam LA, and a laser beam ejected from the optical fiber end 271B (the optical fiber end group 301B) is taken as a laser beam LB. These laser beams are referred to as simply "laser beams" or "laser light" unless particularly required to be distinguished.

With the optical system illustrated in FIG. 19, an image of the light emitting part 280 of the optical fiber array unit 300 is formed near the exposure plane (surface) FA of the plate material F at a predetermine imaging magnification. The imaging magnification is assumed to be ⅓ in the present embodiment. With this, the spot diameter of the laser beams emitted from the optical fiber ends 271A and 271B having a core diameter of 105 μm is approximately ϕ35 μm.

In the exposure head 230 having this imaging system, by appropriately setting an adjacent fiber pitch (L1 in FIG. 17) of the optical fiber array unit 300 described with reference to FIG. 17 and a tilt angle (an angle θ in FIG. 18) of an arrangement direction (an array direction) of the optical fiber end groups 301A and 301B when the optical fiber array unit 300 is fixed, a pitch P1 of scanning lines (main scanning lines) K for exposure with the laser beams ejected from the optical fibers arranged at adjacent positions as illustrated in FIG. 18 can be set at 10.58 μm (corresponding to a resolution of 2400 dpi in the sub-scanning direction).

With the use of the above-structured exposure head 230, a range of sixty-four lines (for one swath) can be simultaneously scanned for exposure.

Figure 20:
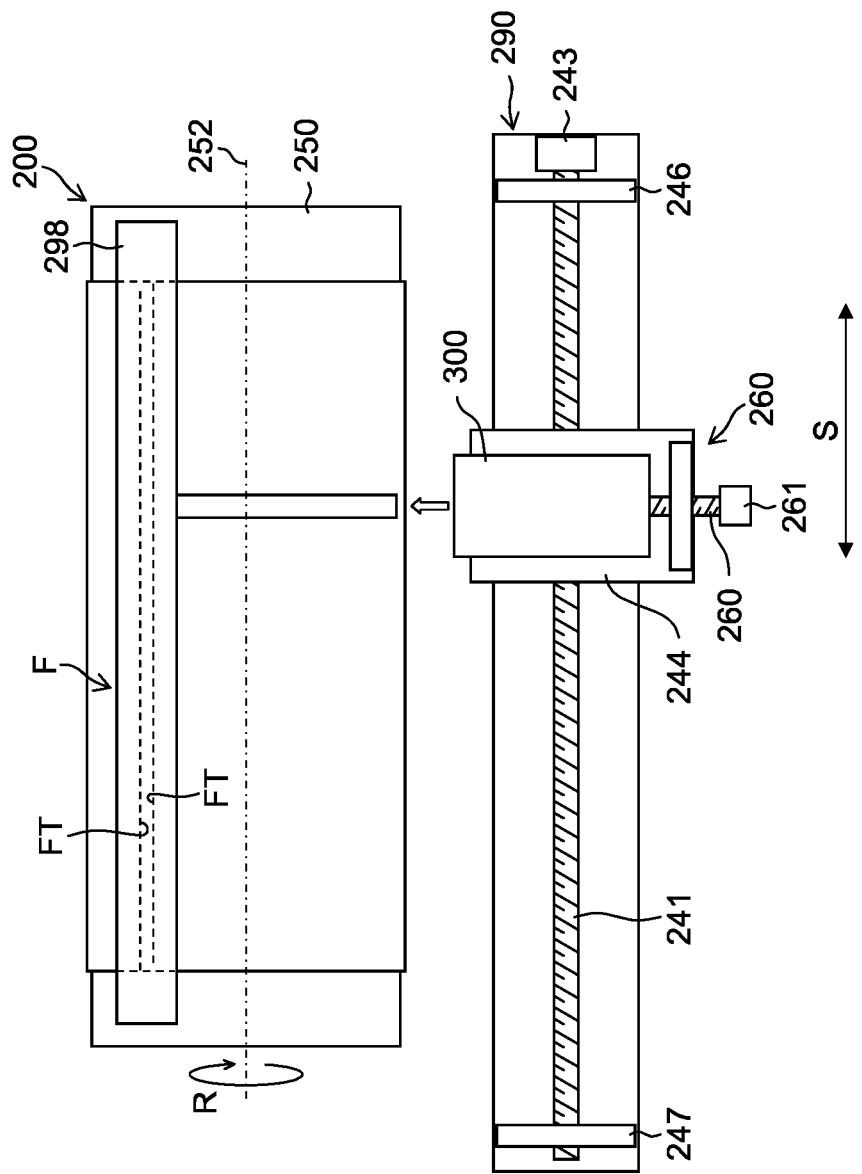
FIG. 20 is a plan view of a general outline of a scanning exposure system in the plate-making apparatus.

FIG. 20 is a plan view of a general outline of the scanning exposure system in the plate-making apparatus 200 illustrated in FIG. 15. The exposure head 230 includes a focus position changing mechanism 260 and an intermittent feeding mechanism 290 in the sub-scanning direction.

The focus position changing mechanism 260 has a motor 261 and a ball screw 261 moving the exposure head 230 forward and backward with respect to the surface of the drum 250. With the control by a motor 261, the focus position of the laser beams can be moved. The intermittent feeding mechanism 290 forms the exposure head moving part 240 described with reference to FIG. 15. The intermittent feeding mechanism 290 includes the ball screw 241 and the sub-scanning motor 243 rotating the ball screw 241 as illustrated in FIG. 20. The exposure head 230 is fixed to a stage 244 on the ball screw 241, and can intermittently feed the exposure head 230 in an axial direction 252 of the drum 250 by one swath (in the case of 2400 dpi, 10.58 μm×64 channels=677.3 μm), with the control by the sub-scanning motor 243.

Note that reference numerals 246 and 247 in FIG. 20 denote bearings that rotatably support the ball screw 241. A reference numeral 298 denotes a chuck member that chucks the plate material F on the drum 250. With the chuck member 298 in a band shape with a rotating axis direction of the drum 250 being taken as a longitudinal direction, the plate material (recording plate) F is mounted on the outer circumferential surface of the drum 250. When a sheet-like plate material is used, the chuck member 298 is mounted on the drum 250 so as to press a portion above an overlapping portion of ends FT of the plate material F, thereby mounting the plate material F on the outer circumferential surface of the drum 250. This portion of the chuck member 298 is in a non-recording area where exposure (recording) by the exposure head 230 is not to be performed.

While the drum 250 is being rotated, laser beams of sixty-four channels are applied from the exposure head 230 to the plate material F on this rotating drum 250, thereby exposing an exposure range for sixty-two channels (for one swath) without a gap and performing engraving with one swath width on the surface of the plate material F. Then, with the rotation of the drum 250, when the chuck member 298 passes in front of the exposure head 230 (in the non-recording area of the plate material F), intermittent feeding is performed in the sub-scanning direction for exposure for the next one swath. By repeating this exposure scanning by intermittent feeding in the sub-scanning direction, a desired image is formed on the entire surface of the plate material F.

While the sheet-like plate material F (recording medium) is used in this example, a cylindrical recording medium (a sleeve type) can also be used.

<Structure of Control System>

Next, the structure of a control system of the plate-making apparatus 200 according to the present embodiment is described.

Figure 21:
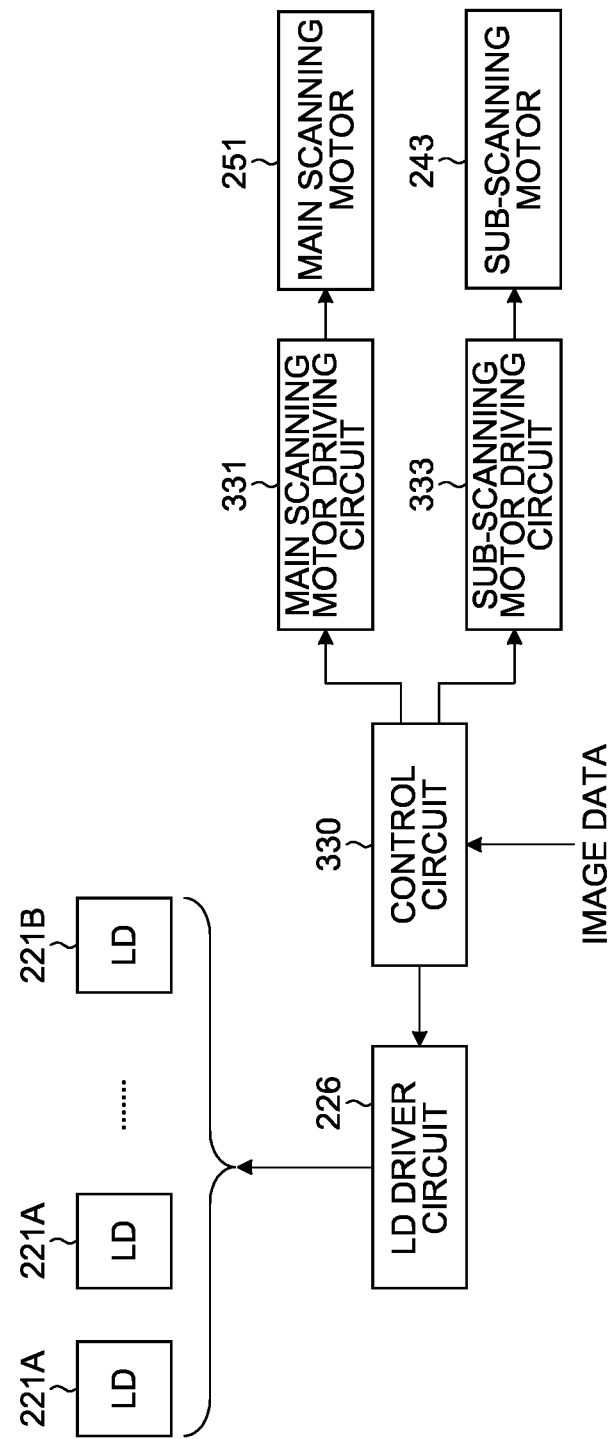
FIG. 21 is a block diagram of the structure of a control system of the plate-making apparatus.

FIG. 21 is a block diagram of the structure of the control system of the plate-making apparatus 200. As illustrated in FIG. 21, the plate-making apparatus 200 includes an LD (Laser Diode) driver circuit 226 driving the respective semiconductor lasers 221A and 221B according to two-dimensional image data to be engraved, the main scanning motor 251 rotating the drum 250, a main scanning motor driving circuit 331 driving the main scanning motor 251, a sub-scanning motor driving circuit 333 driving the sub-scanning motor 243, and a control circuit 330. The control circuit 330 controls the LD driver circuit 226 and each of the motor driving circuits (331 and 333).

The control circuit 330 is supplied with image data representing an image to be engraved (recorded) on a plate material F. Based on this image data, the control circuit 330 controls driving of the main scanning motor 251 and the sub-scanning motor 243, and also individually controls outputs of the semiconductor lasers 221A and 221B (ON/OFF control and power control of laser beams).

Figure 22:
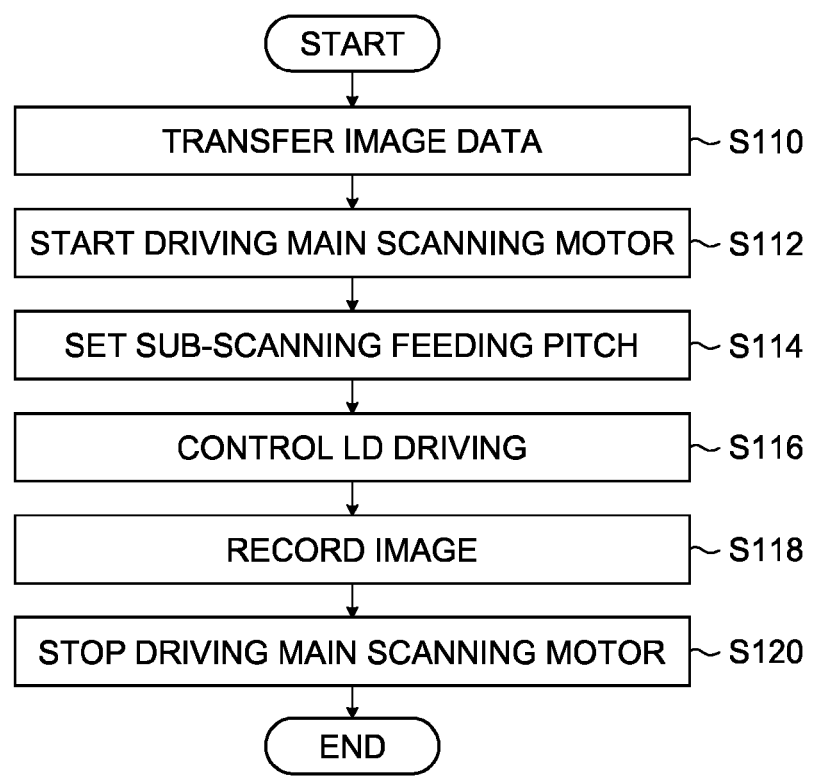
FIG. 22 is a flowchart illustrating a process flow at the time of image recording (making a flexo printing plate) by the plate-making apparatus.

FIG. 22 is a flowchart of a process flow at the time of image recording (making a flexo printing plate) by the plate-making apparatus 200. As illustrated in FIG. 22, first, image data of an image to be engraved (recorded) on the plate material F is transferred from an image memory not illustrated temporarily storing the image data (step S110). The control circuit 330 supplies signals adjusted based on the transferred image data, resolution data indicating a predetermined resolution of the image to be recorded, and data indicative of shallow engraving or deep engraving or the like, to the LD driver circuit 226, the main scanning motor driving circuit 331, and the sub-scanning motor driving circuit 333.

Next, the main scanning motor driving circuit 331 controls the main scanning motor 251 so that the drum 250 is rotated at a rotation speed determined based on the signal supplied from the control circuit 330 (step S112). The sub-scanning motor driving circuit 333 sets a feeding pitch of the exposure head 230 by the sub-scanning motor 243 with respect to the sub-scanning direction (step S114).

Next, the LD driver circuit 226 controls driving of the semiconductor lasers 221A and 221B according to the image data (step S116).

The laser beams LA and LB respectively ejected from the semiconductor lasers 221A and 221B are ejected from the optical fiber ends 271A and 271B of the optical fiber array unit 300 via the optical fibers 222A and 222B, the SC-type optical connectors 225A and 225B, and the optical fibers 270A and 270B, respectively, as has been described with reference to FIG. 15. The light ejected from the optical fiber array unit 300 is changed by the collimator lens 232 to substantially parallel pencils of light, and then its light amount is restricted by the opening member 233, thereby forming an image (gathering light) near the exposure plane FA of the plate material F on the drum 250 via the imaging lens 234 (the imaging surface X and FA may match).

In this case, beam spots are formed on the plate material F according to the laser beams LA and LB ejected from the semiconductor lasers 221A and 221B. With these beam spots, the exposure head 230 is fed with a feeding pitch set at step S114 described above in the sub-scanning direction. Also, with the rotation of the drum 250 started at step S112 described above, a two-dimensional image with a resolution indicated by the resolution data is engraved (formed) on the plate material F (step S118).

Note that when engraving (recording) of a two-dimensional image on the plate material F ends, the main scanning motor driving circuit 331 stops driving the main scanning motor 251 by rotation (step S120), and then ends the process.

<Beam Control in Engraving Area>

Figure 23:
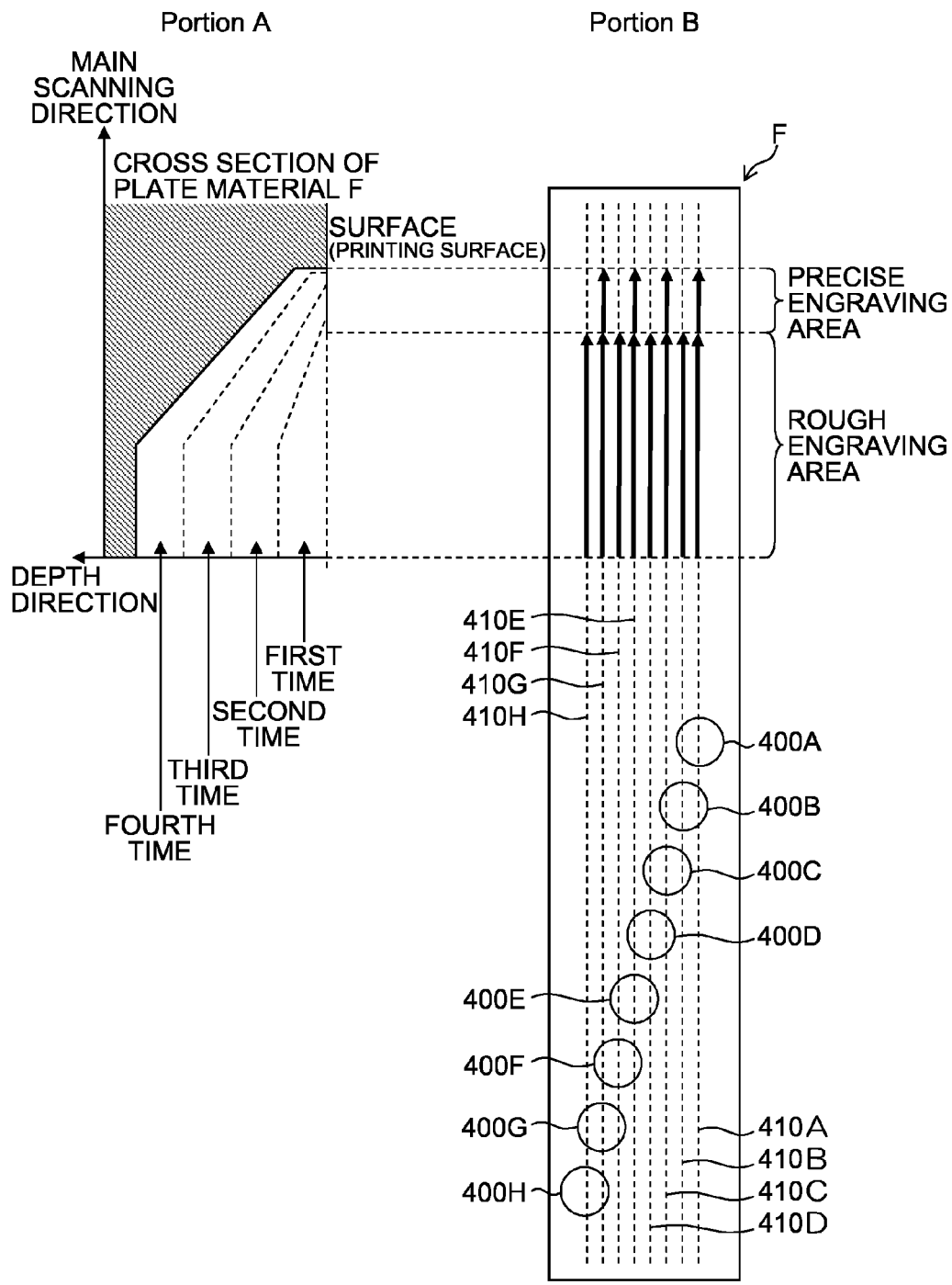
FIG. 23 is an explanatory diagram of an engraving process by the plate-making apparatus.

Next, an exposure scanning process when a printing plate is manufactured by a multibeam exposure system is described. FIG. 23 is an explanatory diagram of a multi exposure engraving process by the plate-making apparatus 200 of this example. In the plate-making apparatus 200 of this example, on a flat shape (the shape of the printing surface) to be left on the surface of the plate material F, an adjacent surrounding portion (a surrounding area) is taken as a precise engraving area, and a surrounding portion further outside of the adjacent surrounding portion is taken as a rough engraving area.

In the present embodiment, with the exposure head 230 being not moved at each sub-scanning position, main scanning (exposure scanning) is performed four times. Also, interlace exposure is performed in the precise engraving area by using beams with a space double the scanning line pitch, and exposure is performed in the rough engraving area by using all beams simultaneously.

FIG. 23 is a diagram of exposure scanning first time to fourth time at the same sub-scanning position. In FIG. 23, Portion A illustrates a cross section of the engraved plate material F, and Portion B illustrates exposure control of laser beams 400A to 400H applied to scanning lines 410A to 410H. Here, for ease of description, the number of laser beams is decreased, and an example is illustrated in which main scanning is performed on the plate material F with the laser beams 400A to 400H in a relatively upper direction in the drawing.

Note that while the cross section of the plate material F has a different degree of engraving depending on which scanning line of any of the laser beams 400A to 400D the cross section is based on, an average engraving depth of the cross section in each scanning line is illustrated herein.

In main scanning at the sub-scanning position for the first time, non-interlace exposure is performed by using all of the laser beams 400A to 400H in the rough engraving area, thereby engraving each of the scanning lines 410A to 410H. When exposure is performed with a plurality of beams arranged in a diagonal direction, with heat of the beam for previous scanning, a ratio of the engraving depth with the next scanning beam is increased. Therefore, with this engraving, a heat flow of the adjacent beam is promoted, thereby improving engraving efficiency.

Also, in the rough engraving area, with the control so that the outputs of the laser beams 400A to 400H are linearly decreased as coming closer to the precise engraving area, unwanted engraving due to heat flowing into the precise engraving area is prevented.

Furthermore, in the precise engraving area, interlace exposure is performed by using a beam group with a pitch between adjacent beams double the scanning line pitch, thereby engraving every other scanning lines. Laser beams simultaneously ejected in a direction orthogonal to the main scanning direction (the sub-scanning direction) do not receive heat interference. Therefore, with this control, only the scanning lines subjected to interlace exposure in the precise engraving area can be subjected to precise engraving.

Also in the precise engraving area, control is performed so that the outputs of the laser beams are linearly decreased as coming closer to the printing surface. With this control, unwanted engraving due to heat flowing into the printing surface is prevented.

In main scanning for the second time, non-interlace exposure is performed by using all of the laser beams 400A to 400H in the rough engraving area. While a heat flow of the adjacent beam is being promoted to improve engraving efficiency, the scanning lines 410A to 410H are engraved. Also, as with the main scanning for the first time, the control is performed so that the outputs of the laser beams 400A to 400H are linearly decreased as coming closer to the precise engraving area.

Furthermore, in the precise engraving area, interlace exposure is performed by using a beam group with a pitch between adjacent beams double the scanning line pitch and not used at the first time, thereby engraving scanning lines not engraved at the first time. Also in the precise engraving area, control is performed so that the outputs of the laser beams are linearly decreased as coming closer to the printing surface. With this control, unwanted engraving due to heat flowing into the printing surface is prevented.

In main scanning for the third time, as with the first and second times, non-interlace exposure is performed by using the laser beams 400A to 400H in the rough engraving area, thereby engraving the scanning lines 410A to 410H. Also, in the precise engraving area, interlace exposure (superposing exposure) is performed by using a beam group with a pitch between adjacent beams double the scanning line pitch, thereby engraving every other scanning lines. Here, exposure scanning is performed by using a first beam group used in the exposure scanning at the first time.

As a result, deeper engraving is made in the rough engraving area than the cross section at the second time, and scanning lines scanned with the first beam group are deeply engraved in the precise engraving area.

Similarly, in main scanning for the fourth time, non-interlace exposure is performed for the fourth time by using the laser beams 400A to 400H, thereby engraving the scanning lines 410A to 410H. Also, in the precise engraving area, interlace exposure (superposing exposure) is performed by using a beam group with a pitch between adjacent beams double the scanning line pitch and not used at the third time, thereby engraving scanning lines not engraved at the third time. Exposure scanning is performed by using only a second beam group used in the exposure scanning at the second time.

As a result, deeper engraving is made in the rough engraving area than the cross section at the third time, and the engraving depth is shallower as coming closer to the precise engraving area. Also, in the precise engraving area, all of the scanning lines at the sub-scanning positions are uniformly engraved by the main scanning at the third time and the main scanning at the fourth time. Furthermore, in the precise engraving area, engraving is made so that a cap steep part is eventually formed on the printing surface.

As such, after engraving for one swath is completed with four rotations of the drum 250, when the chuck member 298 in the non-recording area passes in front of the exposure head 230, the exposure head 230 is intermittently fed in the sub-scanning direction to be moved to a position where engraving is performed for the next adjacent one swath. Then, at that position, exposure scanning is similarly performed. Thereafter, the processes described above are repeated to expose the entire surface of the plate material F.

As described above, a beam group with a pitch between adjacent beams double the scanning line pitch is used in a peripheral part (the precise engraving area). With different scanning lines to be exposed in scanning a plurality of times, each unexposed scanning line between exposed scanning lines is sequentially exposed.

By repeatedly performing interlace exposure four times, the target flat shape and the shape of the surrounding inclined part can be appropriately engraved. Also, by repeating superposing exposure, it is possible to reduce unevenness in cycle and vibration due to an influence of heat of adjacent beams, vibrations in the main scanning direction and the sub-scanning direction at the time of drum rotation, position statically determinate accuracy of the exposure head and feeding accuracy in sub-scanning, and an error due to a pitch error of the array in the sub-scanning direction.

Furthermore, by ejecting beams simultaneously from an ejecting port row of all stages in the surrounding area (the rough engraving area), the flow of heat of adjacent beams can be promoted to improve engraving efficiency.

Note that while description has been made above in which interlace exposure using a beam group with a pitch between adjacent beams double the scanning line pitch is performed repeatedly four times in the precise engraving area to expose each of the scanning lines twice and non-interlace exposure is performed four times in the rough engraving area by using a beam group with a pitch between adjacent beams being the same as the scanning line pitch, their numerical values can be determined as appropriate. That is, the structure can be such that interlace exposure using a beam group with a pitch between adjacent beams N times the scanning line pitch (N is an integer of 2 or more) is repeatedly performed N×m times (m is an integer of 2 or more) in the precise engraving area to expose each of the scanning lines m times and non-interlace exposure using a beam group with a pitch between adjacent beams equal to the scanning line pitch is performed N×m times in the rough engraving area. For these N and m, any desired numerals can be combined as appropriate as long as the numerals are integers of 2 or more.

<Specific Example of Multibeam Micromachining>

Figure 24:
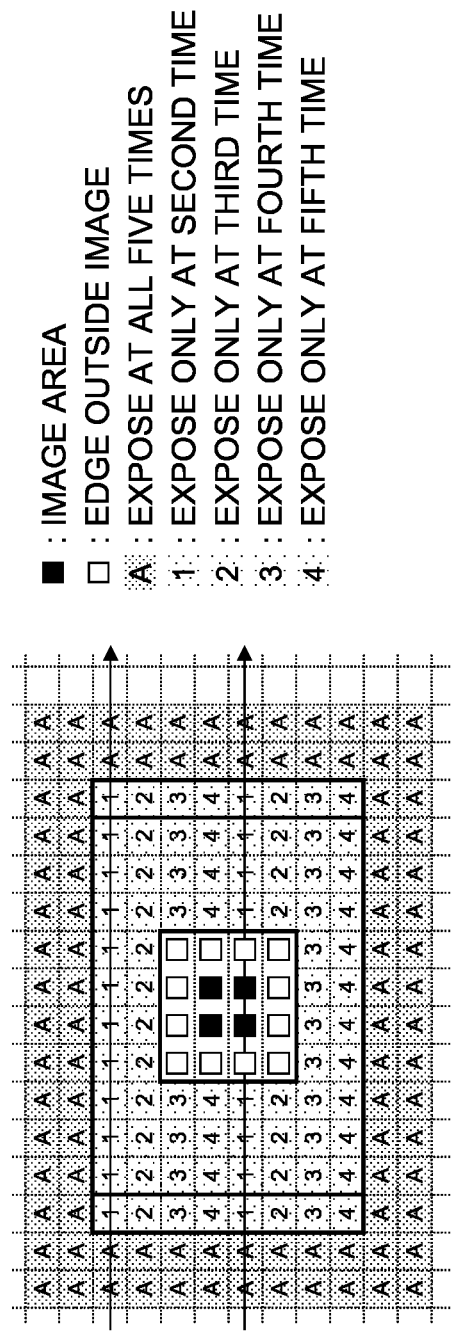
FIG. 24 is an explanatory diagram of a specific example of a multi-beam micromachining type.

FIG. 24 illustrates an example of exposure of the precise engraving area for every four lines. In FIG. 24, the lateral direction represents the main scanning direction. With the rotation of the drum 250, laser light relatively moves from left to right in FIG. 24.

In FIG. 24, center pixels colored in black are black pixels in binary halftone dot image data (an image area). A range of respective outside surrounding pixels bordering this image area (pixels illustrated as hollow pixels in FIG. 24) represents an area of an outside image edge. To the pixels of the outside image edge, a chamfering-purpose exposure amount is provided.

The plate surface is classified (divided) into a precise engraving area and a rough engraving area. The precise engraving area is set as a range of surrounding count pixels adjacent to the image area. The precise engraving area is an area where interlace photometry is performed without simultaneous lighting of adjacent beams. In the example of FIG. 24, exposure is performed every four lines (exposure is performed by decimating the number of beams to be lit up to ¼).

In the rough engraving area, adjacent beams are simultaneously lit up to increase engraving efficiency. In FIG. 24, a pixel area with a reference character "A" is a "rough engraving area". For pixels in the rough engraving area, exposure is performed for all pixels from the first to fifth times. In FIG. 24, pixel areas with reference numerals "1" to "4" are "precise engraving areas". In FIG. 24, for pixels with "1", exposure is performed only at the time of scanning at the second time. Similarly, exposure is performed only at the time of scanning at the third time for pixels with "2", only at the time of scanning at the fourth time for pixels with "3", and only at the time of scanning at the fifth time for pixels with "4".

For the pixels of the outside image edge (the hollow pixels in FIG. 24), a subtle amount of exposure power (a chamfering-purpose exposure amount) is provided at the time of exposing the pixels on the same scanning line.

By adopting this multibeam interlace exposure scanning as described above, highly-accurate microengraving can be performed.

<Second Embodiment>

Figure 25:
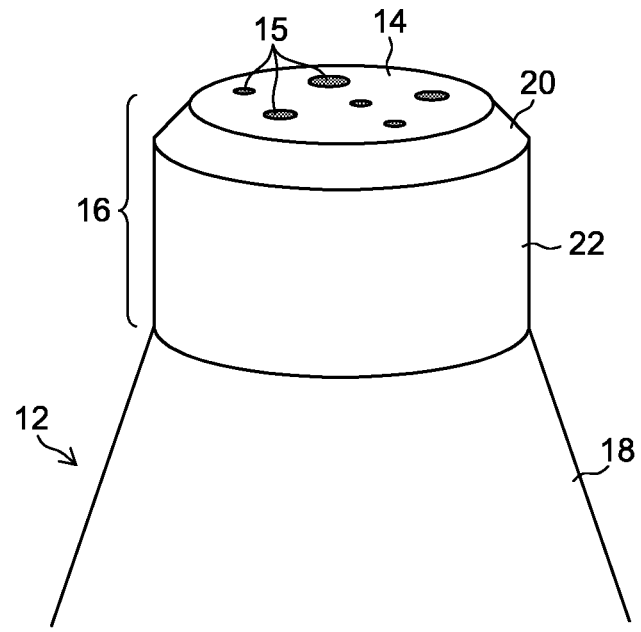
FIG. 25 is a perspective view of main parts schematically illustrating an image of a relief formed on a flexo printing plate according to a second embodiment.
Figure 26:
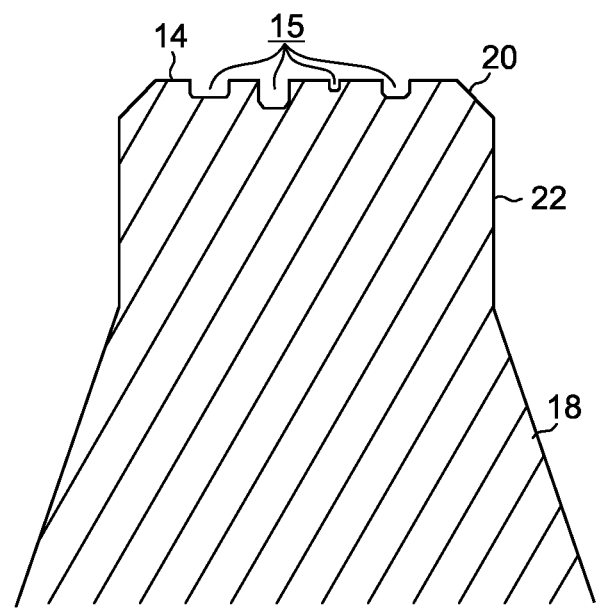
FIG. 26 is a longitudinal cross sectional view of the relief illustrated in FIG. 25.

FIG. 25 is a perspective view of main parts schematically illustrating an image of a relief (a projecting portion formed as a relief) formed on a flexo printing plate according to a second embodiment of the presently disclosed subject matter. FIG. 26 is a longitudinal cross sectional view of the relief. In the second embodiment illustrated in FIG. 25 and FIG. 26, components identical or similar to those of the structure of the first embodiment described with reference to FIG. 1 to FIG. 4 are provided with same reference numerals, and are not described herein.

As a relief projecting portion, the relief 12 having a three-dimensional shape as illustrated in FIG. 25 and FIG. 26 is formed on the flexo printing plate according to the second embodiment. That is, on the top face 14 of the relief 12 according to the second embodiment, a plurality of depressions 15 having irregular dimensions/depths are formed at irregular positions. The depths of the depressions 15 are preferably in a range larger than 0 µm and 20 µm or less. Also, an average of the depths of the plurality of these depressions 15 formed in a random manner is preferably approximately 10 µm. With the plurality of random depressions 15 formed on the relief top face 14, unevenness in density in a printed matter can be prevented.

Figure 27:
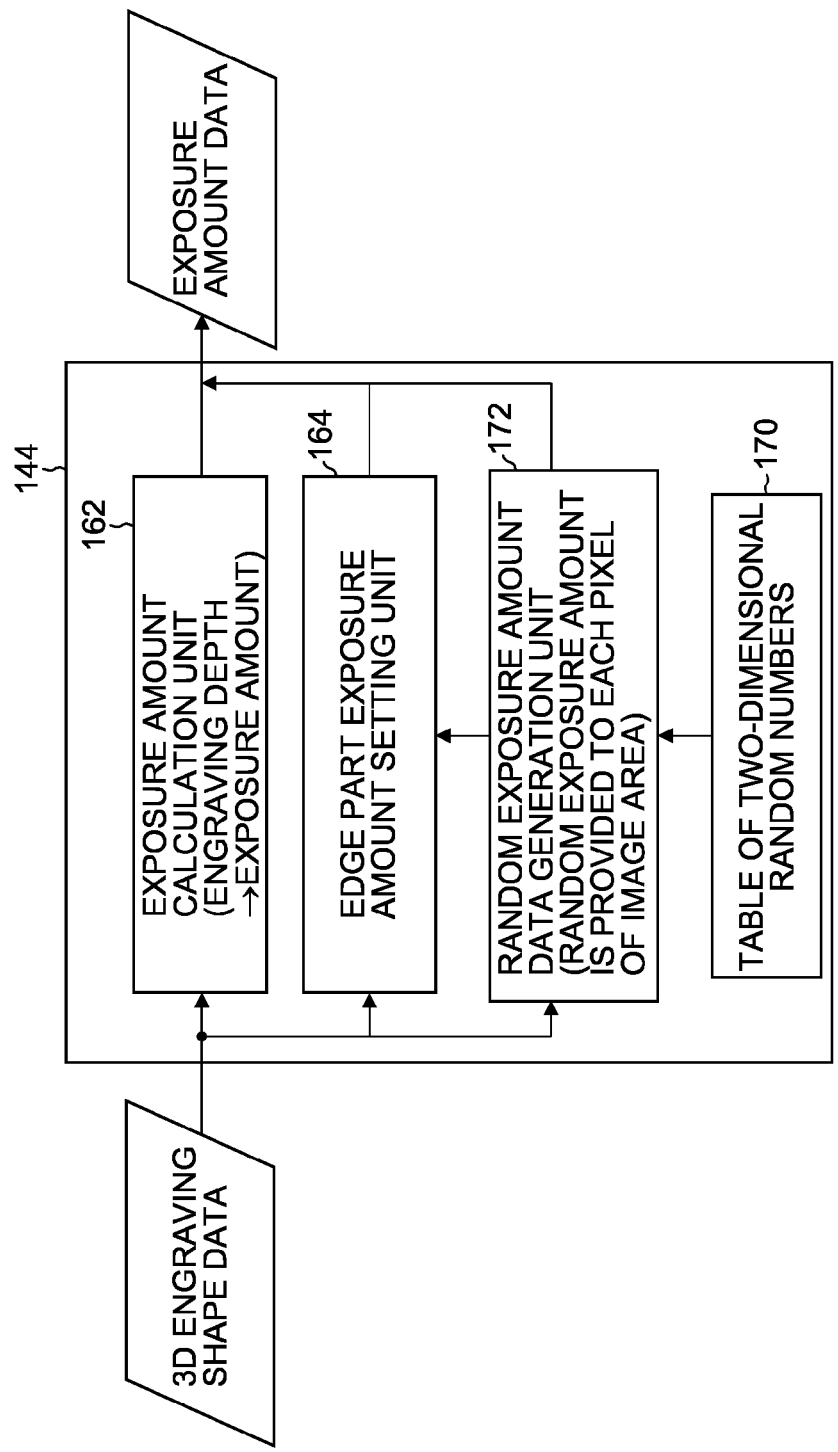
FIG. 27 is a block diagram of an example of structure of an exposure amount conversion unit for use in forming the relief of the second embodiment.

As means for engraving random asperities on the top face 14, for example, the structure as illustrated in FIG. 27 can be adopted. FIG. 27 illustrates the structure that can be applied as the exposure amount conversion unit 144 described with reference to FIG. 5. In place of the structure described with reference to FIG. 10, the structure of FIG. 27 can be adopted.

Note that components in FIG. 27 identical or similar to those of FIG. 10 are provided with same reference numerals, and are not described herein. In FIG. 27, for simplification of the drawing, the chamfering-purpose exposure parameter retaining unit 166 and the input device 168 described with reference to FIG. 10 are omitted, but these components are also included in the example of FIG. 27.

The exposure amount conversion unit 144 illustrated in FIG. 27 includes a table of two-dimensional random numbers 170 and a random exposure amount data generation unit 172 that provides a random exposure amount to each pixel in the image area based on the table 170.

For example, a table of two-dimensional random numbers on the order of 512×512 pixels is retained as a table in a storage unit such as a memory. A depth corresponding to a value of random numbers is calculated. The depth range is preferably in a range of 0 µm to 20 µm, and an average is preferably on the order of 10

Furthermore, by referring to a table of a relation between the exposure amount and the engraving depth, the value of the depth calculated from the random numbers is converted to exposure amount data, and this is retained as a two-dimensional table (for example, having a size on the order of 512×512 pixels).

In the random exposure amount data generation unit 172, an exposure amount is provided by referring to the two-dimensional random table 170 correspondingly to coordinates (x,y) of each pixel in the image area (each ON pixel in the binary image data). When the table size of the table of random numbers is 512×512 pixels, the table of random number is referred to with the remainder of 512 correspondingly to the coordinates (x,y). That is, the table of 512×512 pixels is repeatedly applied.

With this, a random exposure amount is provided to each pixel in the image area according to the two-dimensional table of random numbers 170. According to the random exposure amount, a subtle amount of exposure power is provided to the pixels in the image area, and depressions 15 with irregular sizes and depths are formed at irregular positions on the top face 14. Note that the random exposure amount provided herein is preferably an exposure amount smaller than the chamfering-purpose exposure amount for the edge part.

A random pattern is preferably based on blue noise. By forming the depressions 15 with a random pattern having blue noise characteristics, visibility of unevenness can be decreased.

As has been described in the second embodiment, by forming random asperities (depressions 15) on the relief top surface, smooth grayscale with less unevenness can be obtained with suppressed beat with halftone dots. Also, unevenness due to the asperities of the printing body (printing medium) can be suppressed.

Providing these depressions 15 on the top face to a filled-in part is also effective. By forming the random depressions 15 on the top face of the filled-in part, the filled-in part is prevented from being hidden, and also a marginal phenomenon can be reduced. To engrave random asperities in this manner, high-resolution beams are not necessarily required.

Note that as with the top face 14 of the halftone dot projecting part, the printing surface of the filled-in part on the plate is formed to have the same height as that of the top face 14 of the halftone dot projecting part.

<Printing Process of Flexo Printing>

Figure 28:
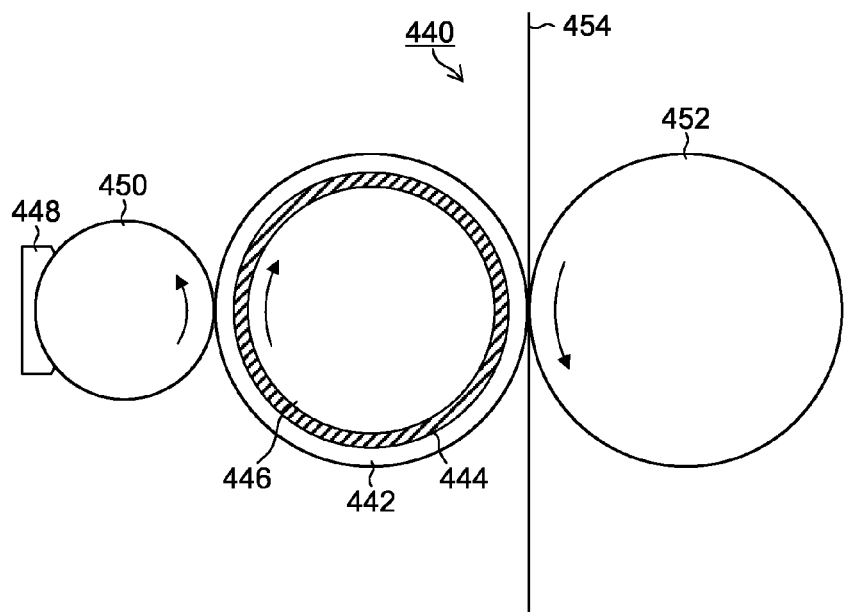
FIG. 28 is a structural diagram of main parts of a flexo printing machine.

The flexo printing plate described in the first or second embodiment is mounted on a flexo printing machine and is used for printing. FIG. 28 is a structural diagram of main parts of the flexo printing machine. As illustrated in FIG. 28, a flexo printing machine 440 includes a flexo printing plate (a relief printing plate with a relief formed as a halftone dot on a resin-made sheet) 442, a plate cylinder 446 on which this flexo printing plate 442 is mounted via a cushion tape 444 such as a double-sided tape, an anilox roller 450 to which ink is supplied by a doctor chamber 448, and an impression cylinder 452.

As the flexo printing plate 442, a relief printing plate having a relief shape described in the first embodiment and the second embodiment (the flexo printing plate 10) is applied. To the top part (the printing surface) of each relief of the flexo printing plate 442, ink is transferred by the anilox roller 450. This ink is transferred to a printing body 454 conveyed as being interposed between the plate cylinder 447 on which the flexo printing plate 442 is mounted and the impression cylinder 452. With this, a printed matter is obtained.

<Results of Evaluating Image Quality of Printed Matter>

Figure 29:
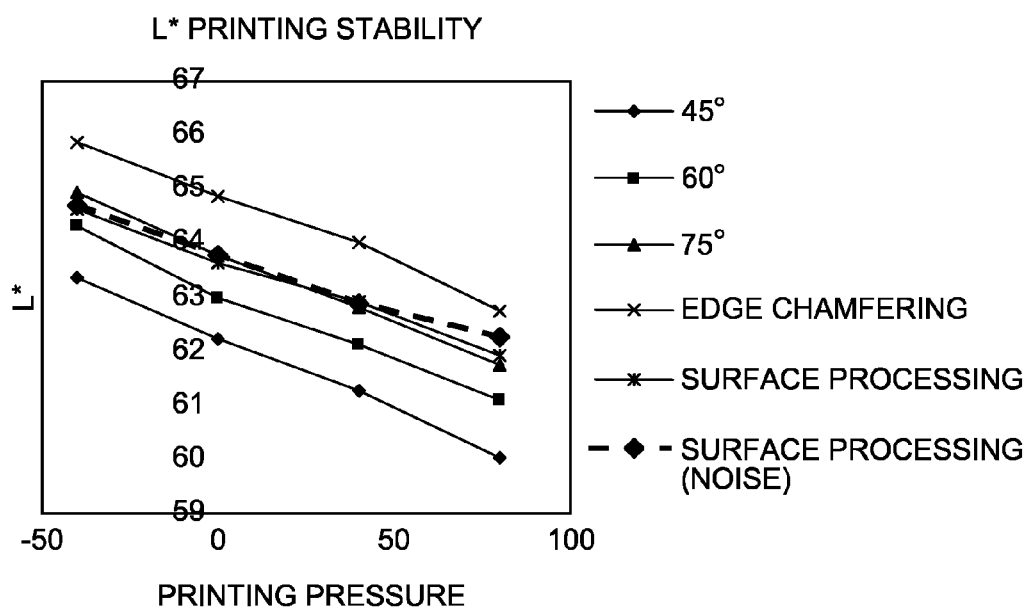
FIG. 29 is a graph illustrating fluctuations in printing pressure of L* (brightness) of the printing result with a tint of 50%.

FIG. 29 is a graph illustrating fluctuations in printing pressure of L* (brightness) of the printing result with a tint of 50%. The horizontal axis represents a printing pressure, and illustrates a pressing amount in units of μm. The vertical axis represents L*. As a printed matter, larger (brighter) L* and less change with respect to the printing pressure as much as possible are preferable (i.e. the printing pressure is preferably almost constant).

In FIG. 29, image quality of printed matters obtained from the following printing plates are evaluated: one with a tilt angle of the relief of 45 degrees (without chamfering of the edge part), one with a tilt angle of 60 degrees (without chamfering of the edge part), one with a tilt angle of 75 degrees (without chamfering of the edge part), one with a chamfered edge part (a tilt angle of 60 degrees), one with a top face subjected to surface processing (asperities with regular lines are formed), and one with a top face subjected to surface processing (depressions are formed by random exposure with random noise).

As illustrated in FIG. 29, it can be found that the one with a chamfered edge part is highly effective in reducing dot gain.

Figure 30:
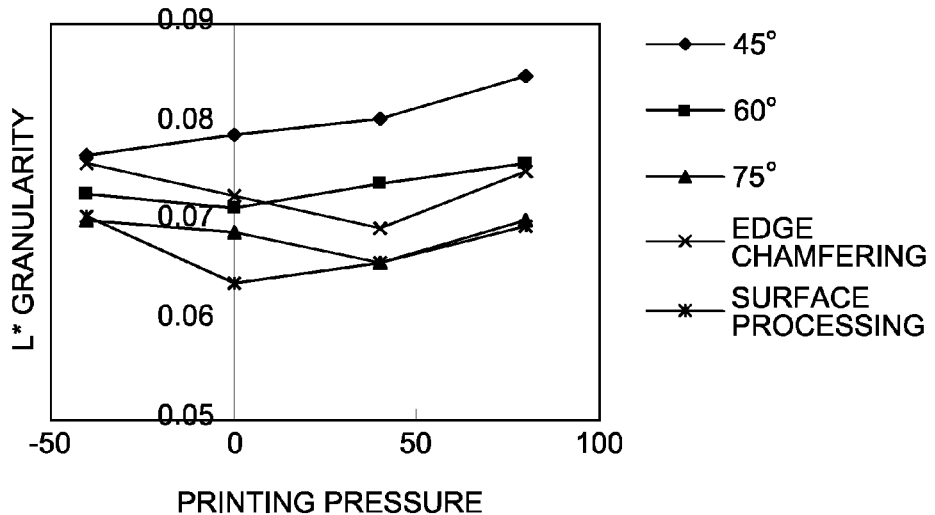
FIG. 30 is a graph illustrating fluctuations in printing pressure of granularity L* regarding the printing result with a tint of 50%.

FIG. 30 is a graph illustrating fluctuations in printing pressure of granularity regarding the printing result with a tint of 50%. Here, while L* granularity is used as an index, L* granularity is not restrictive for image quality evaluation, and another index (for example, density) may be used.

L* granularity is defined by the following equation.

$$GS = \iint VTF(u) \cdot \sqrt{WS(u,\theta)} \, du \, d\theta$$

$$VTF(u) = 50.5 \times [\exp(-0.138 \cdot \pi \cdot l \cdot u/180) \times |1 - \exp(-0.1 \cdot \pi \cdot l \cdot u/180)]$$ [Equation 1]

Here, the meaning of each symbol in the equation is as follows.

GS: granularity
WS: noise Wiener spectrum
u: spatial frequency (Cy/mm)
θ: two-dimensional direction
VTF (visual transfer function): MTF (modulation transfer function) of a visual system (frequency characteristic)
l: observation distance (mm)

As a printed matter, smaller L* granularity and less change with respect to the printing pressure as much as possible (nearly constant) are preferable. As illustrated in FIG. 30, it can be found that the one with asperities formed on the top face is highly effective regarding unevenness and graininess.

From the results illustrated in FIG. 29 and FIG. 30, it can be found that the one with a chamfered edge of the cap part and further with random depressions formed on the top face is particularly preferable.

Modification Examples

In the embodiments described above, from the relation between the beam diameter and the size of one pixel, the structure is adopted in which a chamfer-purpose subtle exposure amount to the range of respective surrounding pixels adjacent to the black pixels and having a pixel value of "1" (ON). This example is not restrictive in order to implement the presently disclosed subject matter.

For example, when the beam diameter is extremely large compared with one pixel, surrounding pixels further outside the white pixels adjacent to the black pixels (pixels with a distance to the nearest ON pixel of "2" pixels) may be taken as "outside image adjacent pixels", and the chamfering-purpose exposure amount may be provided to surrounding pixels not adjacent to the black pixels.

By applying laser light according to the chamfering-purpose exposure amount data to be provided to the outside image adjacent pixels, laser light is applied to the inside of the area (the ON area) of the black pixels in the original binary image. A range to be cut out with this chamfering exposure from the original area of the black pixels is preferably a range less than one pixel.

<Relief Shape of Small Dot>
<<Problem>>

In the case of flexo printing, as for a dot of a halftone dot % or the like, the top face of the cap part is normally pressed up to approximately 40 μm. However, in the case of a small dot where a dot diameter is required to be on the order of 35 μm, the top face is disadvantageously further pressed by printing pressure because the relief is thin. That is, in the case of a small dot, the amount of pressing the top face of the cap part is increased with respect to the printing pressure. At that time, superfluous ink attached on the frustum part is disadvantageously transferred to printing paper to cause a stain or the like.

<<Means for Solving the Problem>>

To solve the problem as described above, the printing pressure exerted on a relief of a small dot is required to be reduced more than the case of a dot of a halftone dot %. Thus, for the relief for a small dot, the structure is adopted in which the steep part (the cap steep part) of the cap part is further deeply engraved.

Figure 31:
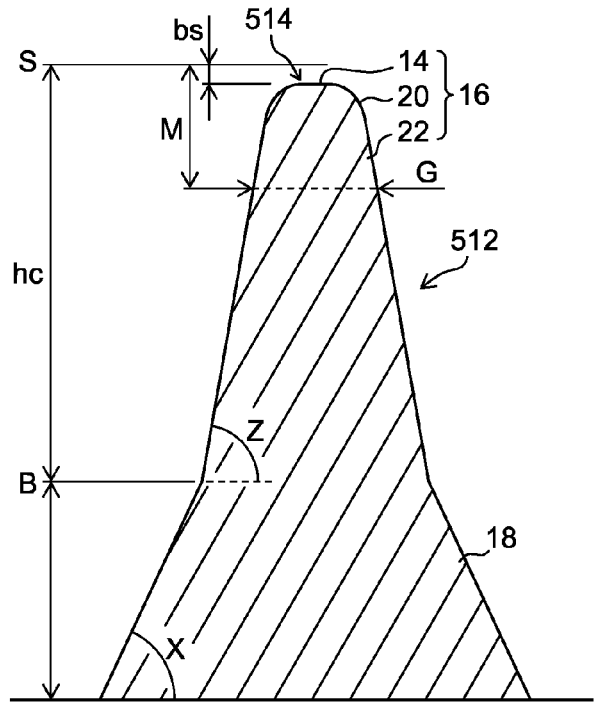
FIG. 31 is an explanatory diagram of a relief shape for a small dot.

An example is illustrated in FIG. 31. FIG. 31 is a longitudinal cross sectional view of the shape of a projection (a relief) for a small dot having a diameter on the order of 35 μm. In FIG. 31, components identical or similar to those of the structure described with reference to FIG. 1 and FIG. 2 are provided with same reference numerals. A relief 512 for a small dot illustrated in FIG. 31 has the cap part 16 and the frustum part 18. A side surface (lateral surface) of the frustum part 18 supporting the cap steep part 22 has a gradient (a tilt angle x) of 50 degrees or more and 70 degrees or less. A side surface of the cap steep part 22 has a gradient (a tilt angle z) larger than the gradient (the tilt angle x) of the frustum part 18, and is formed in a range of, for example, 75 degrees or more and 85 degrees or less.

The steep part (the cap steep part 22) of the cap part 16 is engraved to a depth (denoted by reference character hc) on the order of 100 μm with reference to the top face of a relief (not illustrated) highest on the relief printing plate where the relief 512 is formed. An example of the "top face of the highest relief" is a relief with filled-in density.

In FIG. 31, the position (height) of the top face (a reference plane) of the highest relief is denoted by a reference character S, and the position of a boundary (the lowermost end of the steep part 22) between the cap steep part 22 and the frustum part 18 is denoted by a reference character B. The depth hc from the reference plane S to the lowermost end B of the cap steep part 22 is formed to be on the order of 100 μm.

That the depth hc is on the order of 100 μm means herein that there is an appropriate tolerance before and after 100 μm, which is taken as a rough index. The index and tolerance of the depth hc are defined as appropriate in a range in which it is possible to obtain an operation and effect where superfluous ink attached onto the frustum part 18 is not transferred to printing paper. For example, when the pressing amount by printing press is 40 μm, if a preferable value of the depth hc is a value double or more the pressing amount, the depth hc is preferably 80 μm or more. As the depth hc is deeper, a stain prevention effect is increased. However, excessively deep engraving can pose problems such as a decrease in relief shape stability and falling down of the relief. In a range not causing such problems, an upper limit value of the depth hc is defined.

A portion (denoted by a reference character M) to be pressed by printing pressure is in a range on the order of 40 μm from the reference plane S in a depth direction. Therefore, correspondingly to the pressing amount (on the order of 40 μm) by this printing pressure, a thickness (an outer diameter) G at a depth position on the order of 40 μm from the reference plane S of the cap steep part 22 is formed on the order of 35 μm (on the order of the diameter of the dot).

Also, to suppress an increase in thickness of the small dot, a lowered part 514 may be provided in which the top face 14 of the cap part 16 is formed lower than the height of the "top face of the highest relief" (the reference face S). The lowered part 514 refers to a portion engraved up to a predetermined depth (a lowering amount bs) with reference to the top face (the reference plane S) of the highest relief. The lowering amount bs is preferably on the order of 20 μm to 30 μm. With this structure, the printing pressure exerted on the top face 14 of the cap part 16 is further suppressed, and an increase in thickness of the dot can be suppressed.

As described with reference to FIG. 31, the structure of the relief for a small dot is such that the cap part 16 is deeply engraved to a level on the order of 100 μm from the reference plane S. With this, a sufficient distance can be ensured from the reference plane S to the frustum part 18. Even in consideration of the pressing amount by printing pressure, superfluous ink attached onto the frustum part 18 is not transferred to printing paper, and therefore a stain can be prevented.

Note that while the top face 14 of the cap part 16 is rendered as a flat surface and the cap chamfered part 20 is rendered as a rounded curved surface in FIG. 31, the top face 14 itself can be configured as a rounded curved surface, and the top face and the cap chamfered part can integrally form a smooth curved surface.

<Other Examples of Application>

While flexo printing is described in the above description, the presently disclosed subject matter can be widely applied to relief printing using a resilient plate material such as resin or rubber.

The presently disclosed subject matter can be provided as a computer-readable program code for causing a computer to execute the above described process, a non-transitory computer-readable recording medium (for example, an optical disc such as a CD (Compact Disc), a DVD (Digital Versatile Disc) and a BD (Blu-ray Disc), a magnetic disc such as a hard disc, a magneto-optical disc) on which the computer-readable program code is stored. Also, the presently disclosed subject matter can be provided as a computer program product storing executable code for executing a process of the above described method.

The range of applying the presently disclosed subject matter is not restricted by the embodiments described above, and it goes without saying that various improvements and modifications can be made in a range not deviating from the gist of the presently disclosed subject matter. Many modifications can be made by a person having a common knowledge in the field within the technical idea of the presently disclosed subject matter.

<Other Disclosed Aspects of the Presently Disclosed Subject Matter>

As can be understood from the description of the embodiments of the presently disclosed subject matter described in detail above, the specification also includes the following disclosure of aspects of the presently disclosed subject matter.

(Aspect 1): A relief printing plate includes: a plate material; and a relief formed on the plate material, the relief printing plate configured to transfer ink which is provided to a top face of the relief, to a printing body. The relief includes: a cap part including the top face; and a frustum part configured to support the cap part. The cap part includes: the top face including a flat surface parallel to a horizontal plane orthogonal to a gravitational direction when the top face is oriented upward; a cap chamfered part including a flange part of the top face at least partially chamfered to form a curved surface not perpendicular to the top face; and a cap steep part formed downward from the cap chamfered part in the gravitational direction at a steep angle nearly perpendicular to the top face. The frustum part has a shape thicker than the cap steep part and has a cross sectional area of a cross section gradually increasing toward a bottom of the relief.

Since the top face of the cap part configuring a relief top face has a horizontal flat surface, ink can be stably transferred from a roller such as an anilox roller for providing the ink to the relief printing plate. With the flange part of the top face provided with the cap chamfered part, ink on the top face can moderately escape to the cap chamfered part by printing pressure, thereby reducing the spread of ink due to a marginal phenomenon. Also, with provision of the cap perpendicular part (cap steep part) with a constant thickness, even if the printing pressure fluctuates to cause fluctuations of the pressing amount in a vertical direction, an increase in thickness of a dot due to deformation of the cap part is approximately constant. Furthermore, since the frustum part supporting the cap part has a shape gradually widened in a stable manner, the relief can be prevented from falling down due to printing pressure.

(Aspect 2): In the relief printing plate according to Aspect 1, the cap chamfered part is formed in a range of 5 μm or more and 20 μm or less from the top face in a depth direction.

(Aspect 3): In the relief printing plate according to Aspect 1 or 2, the cap part is preferably configured to be formed in a range of 10 μm or more and 40 μm or less from the top face in a depth direction.

When the cap part is formed with a depth in a range of 10 μm to 40 μm, the cap chamfered part preferably has a depth with its upper limit approximately half the depth (thickness) of the cap part. For example, when the depth of the cap part is 30 μm from the top face, the depth of the cap chamfered part (the depth to the lower end of the chamfered part) is preferably 15 μm or less.

(Aspect 4): In the relief printing plate according to any one of Aspects 1 to 3, a side surface of the frustum part has a gradient in a range of 50 degrees or more and 70 degrees or less.

With the inclined surface portion of the frustum part formed gently, the relief can be effectively prevented from falling down even if the area of the top face is small.

(Aspect 5): In the relief printing plate according to any one of Aspects 1 to 4, the top face has an area smaller than an ON area of pixels on the plate corresponding to an ON portion in a digital binary image representing an image to be printed.

With the flange part of the top face chamfered, the area corresponding to the ON portion of the binary image is partially cut out near an edge, and the area of the top face can be smaller than the area of the ON area. With this, an increase in thickness due to the spread of ink can be suppressed, thereby allowing ink to be transferred to the printing body in a target image range.

(Aspect 6): In the relief printing plate according to any one of Aspects 1 to 5, the top face has a plurality of depressions having irregular depths formed at irregular positions.

According to this aspect, unevenness of ink transferred onto the printing body can be suppressed.

(Aspect 7): In the relief printing plate according to Aspect 6, the irregular depths of the plurality of depressions are in a range larger than 0 µm and 20 µm or less.

By forming depressions having various depths distributed in the range of 0 µm to 20 µm in a random manner, unevenness of the halftone dot part and the filled-in part can be mitigated.

(Aspect 8): In the relief printing plate according to any one of Aspects 1 to 7, the relief is engraved on the printing body by laser engraving.

Since the shape in the depth direction can be easily controlled in laser engraving, laser engraving means is preferably used as means that forms the relief with the stereoscopic shape specified by the presently disclosed subject matter.

What is claimed is:

1. A relief printing plate manufacturing method of manufacturing a relief printing plate by laser engraving, the method comprising:
    a binary image data generating step of generating binary image data based on multivalued image data representing a printing image;
    an engraving target shape data generating step of generating, from the binary image data, target stereoscopic shape data as an engraving target;
    an exposure amount data generating step of calculating, based on the target stereoscopic shape data, exposure amount data, based on which an output of laser light by a laser engraving machine is controlled;
    an edge exposure amount setting step of providing a predetermined exposure amount to an outside image adjacent pixel in a range of predetermined pixels adjacent to an ON pixel corresponding to an image part of the binary image data; and
    a laser engraving step of applying laser light to an area of OFF pixels corresponding to a no-image part of the binary image data on the plate based on the exposure amount data to engrave a portion outside of an area to be left on the plate as the image part, and applying laser light to the outside image adjacent pixel on the plate based on the predetermined exposure amount set in the edge exposure amount setting step to form a relief having a projecting shape with a corner part of a flange part of a top face of the relief corresponding to the image part at least partially chamfered from the top face toward a depth direction.

2. The relief printing plate manufacturing method according to claim 1, wherein,
    with an application of laser light to the outside image adjacent pixel in the laser engraving step, the top face of the relief on the plate has an area smaller than an area of the ON pixel in the binary image data.

3. The relief printing plate manufacturing method according to claim 1, wherein
    an exposure amount to be provided to the outside image adjacent pixel is smaller than an exposure amount to be provided to an area of the OFF pixels corresponding to the no-image part.

4. The relief printing plate manufacturing method according to claim 1, wherein
    the laser beam to be applied onto the plate has a beam diameter larger than a width of one pixel of the binary image data.

5. The relief printing plate manufacturing method according to claim 1, wherein
    the outside image adjacent pixel is in a range of respective surrounding pixels adjacent to the ON pixel.

6. The relief printing plate manufacturing method according to claim 1, wherein
    parameters of an exposure amount required for chamfering the flange part of the top face are retained according to types of plate materials, and
    data of the predetermined exposure amount is variably set correspondingly to a type of a plate material for use.

7. The relief printing plate manufacturing method according to claim 1, wherein
    parameters of an exposure amount required for chamfering the flange part of the top face are retained according to combinations of types of plate materials and types of printing bodies, and
    data of the predetermined exposure amount is variably set correspondingly to a combination of a type of a plate material and a type of a printing body for use.

8. The relief printing plate manufacturing method according to claim 1, wherein
    the relief includes: a cap part including the top face; and a frustum part configured to support the cap part,
    the cap part includes: the top face including a flat surface parallel to a horizontal plane orthogonal to a gravitational direction when the top face is oriented upward; a cap chamfered part including a flange part of the top face at least partially chamfered from the top face toward the depth direction to form a curved surface not perpendicular to the top face; and a cap steep part formed downward from the cap chamfered part in the gravitational direction at a steep angle nearly perpendicular to the top face, and
    the frustum part has a shape thicker than the cap steep part having a cross sectional area of a cross section gradually increasing toward a bottom of the relief.

9. The relief printing plate manufacturing method according to claim 1, further comprising:
    a random exposure amount providing step of providing an exposure amount to a pixel area corresponding to the top face of the relief in a random manner; and
    a random asperities forming step of applying laser light to the top face of the relief according to the exposure amount provided in the random manner to form a plurality of depressions having irregular depths at irregular positions on the top face of the relief.

10. The relief printing plate manufacturing method according to claim 9, wherein
    an exposure amount to be provided to the top face in the random manner is smaller than an exposure amount to be provided to the outside image adjacent pixel.

11. A relief printing plate creating apparatus creating a relief printing plate by laser engraving, the apparatus comprising:
    a binary image data generating device configured to generate binary image data based on multivalued image data representing a printing image;
    an engraving target shape data generating device configured to generate, from the binary image data, target stereoscopic shape data as an engraving target;
    an exposure amount data generating device configured to calculate, based on the target stereoscopic shape data, exposure amount data, based on which an output of laser light by a laser engraving machine is controlled;
    an edge exposure amount setting device configured to provide a predetermined exposure amount to an outside image adjacent pixel in a range of predetermined pixels adjacent to an ON pixel corresponding to an image part of the binary image data; and
    a laser engraving device configured to apply laser light to an area of OFF pixels corresponding to a no-image part of the binary image data on the plate based on the exposure amount data to engrave a portion surrounding an area to be left on the plate as the image part, and to apply laser light to the outside image adjacent pixel on the plate based on the predetermined exposure amount set by the edge exposure amount setting device to form a relief having a projecting shape with a corner part of a flange part of a top face of the relief corresponding to the image part at least partially chamfered from the top face toward a depth direction.

12. The relief printing plate creating apparatus according to claim 11, wherein,
    with an application of laser light to the outside image adjacent pixel by the laser engraving device, the top face of the relief on the plate has an area smaller than an area of the ON pixel in the binary image data.

13. The relief printing plate creating apparatus according to claim 11, wherein
    an exposure amount to be provided to the outside image adjacent pixel is smaller than an exposure amount to be provided to the area of the OFF pixels corresponding to the no-image part.

14. The relief printing plate creating apparatus according to claim 11, wherein
    the laser beam to be applied onto the plate has a beam diameter larger than a width of one pixel of the binary image data.

15. The relief printing plate creating apparatus according to claim 11, wherein
    the outside image adjacent pixel is in a range of respective surrounding pixels adjacent to the ON pixel.

16. The relief printing plate creating apparatus according to claim 11, further comprising
    a parameter recording device configured to record parameters of an exposure amount required for rounding or chamfering the flange part of the top face according to types of plate materials, wherein
    data of the predetermined exposure amount is variably set correspondingly to a type of a plate material for use.

17. The relief printing plate creating apparatus according to claim 11, further comprising
    a parameter recording device configured to record parameters of an exposure amount required for rounding or chamfering the flange part of the top face according to combinations of types of plate materials and types of printing bodies, wherein
    data of the predetermined exposure amount is variably set correspondingly to a combination of a type of a plate material and a type of a printing body for use.

18. The relief printing plate creating apparatus according to claim 11, wherein
    the relief includes: a cap part including the top face; and a frustum part configured to support the cap part,
    the cap part includes: the top face including a flat surface parallel to a horizontal plane orthogonal to a gravitational direction when the top face is oriented upward; a cap chamfered part including a flange part of the top face at least partially chamfered from the top face toward the depth direction to form a curved surface not perpendicular to the top face; and a cap steep part formed downward from the cap chamfered part in the gravitational direction at a steep angle nearly perpendicular to the top face, and
    the frustum part has a shape thicker than the cap steep part having a cross sectional area of a cross section gradually increasing toward a bottom of the relief.

19. The relief printing plate creating apparatus according to claim 11, further comprising
    a random exposure amount providing device configured to provide an exposure amount to a pixel area corresponding to the top face of the relief in a random manner, wherein
    the laser engraving device applies laser light to the top face of the relief according to the exposure amount provided in the random manner to form a plurality of depressions having irregular depths at irregular positions on the top face of the relief.

20. The relief printing plate creating apparatus according to claim 19, wherein
    an exposure amount to be provided to the top face in the random manner is smaller than an exposure amount to be provided to the outside image adjacent pixel.

21. A non-transitory computer-readable recording medium including instructions stored thereon, such that when the instructions are read and executed by a processor, the processor is configured to perform the steps of:
    a binary image data generating step of generating binary image data based on multivalued image data representing a printing image;
    an engraving target shape data generating step of generating, from the binary image data, target stereoscopic shape data as an engraving target;
    an exposure amount data generating step of calculating, based on the target stereoscopic shape data, exposure amount data, based on which an output of laser light by a laser engraving machine is controlled; and
    an edge exposure amount setting step of providing a predetermined exposure amount to an outside image adjacent pixel in a range of predetermined pixels adjacent to an ON pixel corresponding to an image part of the binary image data,
    wherein laser light is applied to an area of OFF pixels corresponding to a no-image part of the binary image data on the plate based on the exposure amount data to engrave a portion outside of an area to be left on the plate as the image part, and laser light is applied to the outside image adjacent pixel on the plate based on the predetermined exposure amount set in the edge exposure amount setting step to form a relief having a projecting shape with a corner part of a flange part of a top face of the relief corresponding to the image part at least partially chamfered from the top face toward a depth direction.

22. The recording medium according to claim 21, the processor is configured to perform
    a random exposure amount providing step of providing an exposure amount in a random manner to a pixel area corresponding to a top face of a relief corresponding to the image part.

* * * * *